United States Patent
Robinson

(10) Patent No.: US 10,194,415 B2
(45) Date of Patent: *Jan. 29, 2019

(54) SYSTEMS AND METHODS FOR PROVIDING LOCATION SPECIFIC CONTENT AND NOTIFICATIONS UTILIZING BEACONS AND DRONES

(71) Applicant: Fresh Digital, Inc., New York, NY (US)

(72) Inventor: Douglas Eugene Robinson, New York, NY (US)

(73) Assignee: Fresh Digital, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,635

(22) Filed: Nov. 28, 2017

(65) Prior Publication Data

US 2018/0146448 A1   May 24, 2018

Related U.S. Application Data

(63) Continuation of application No. 14/993,056, filed on Jan. 11, 2016, now Pat. No. 9,832,751.
(Continued)

(51) Int. Cl.
*H04W 24/00* (2009.01)
*H04W 64/00* (2009.01)
(Continued)

(52) U.S. Cl.
CPC .......... *H04W 64/00* (2013.01); *B64C 39/024* (2013.01); *G01S 1/02* (2013.01); *G01S 5/02* (2013.01);
(Continued)

(58) Field of Classification Search
None
See application file for complete search history.

(56) References Cited

U.S. PATENT DOCUMENTS

| | | | |
|---|---|---|---|
| 7,599,789 B2* | 10/2009 | Leonard | G01C 21/005 382/103 |
| 8,930,044 B1* | 1/2015 | Peeters | B64C 19/00 701/2 |

(Continued)

OTHER PUBLICATIONS

International Search Report and Written Opinion of the International Searching Authority, dated Apr. 29, 2016, in connection with International Application No. PCT/US2016/012920 (9 pages).

*Primary Examiner* — Erika A Washington
(74) *Attorney, Agent, or Firm* — McCarter & English, LLP

(57) ABSTRACT

Venue information is stored, the venue information including a first location portion of the venue and a second location portion of the venue. An actual presence of a location sensing mobile device is identified within the venue, the actual presence identified based on beacon signals received from a beacon associated with the first location portion of the venue. A first drone associated with the first location portion of the venue is selected based on the actual presence. First sensor data is received from the first drone. A virtual presence of the location sensing mobile device is received, the virtual presence being different from the actual presence. A second drone associated with the second location portion of the venue is selected based on the virtual presence. Second sensor data is received from the second drone. The first and second sensor data is transmitted to the location sensing mobile device.

24 Claims, 18 Drawing Sheets

Related U.S. Application Data

(60) Provisional application No. 62/101,869, filed on Jan. 9, 2015.

(51) Int. Cl.
| | |
|---|---|
| *H04W 4/029* | (2018.01) |
| *B64C 39/02* | (2006.01) |
| *G01S 1/02* | (2010.01) |
| *H04W 4/04* | (2009.01) |
| *G01S 5/02* | (2010.01) |
| *H04W 4/40* | (2018.01) |

(52) U.S. Cl.
CPC ............ *H04W 4/029* (2018.02); *H04W 4/043* (2013.01); *H04W 4/40* (2018.02); *B64C 2201/027* (2013.01); *B64C 2201/127* (2013.01)

(56) References Cited

U.S. PATENT DOCUMENTS

| | | | |
|---|---|---|---|
| 9,832,751 B2* | 11/2017 | Robinson, Jr. | ........ H04W 64/00 |
| 2008/0072284 A1* | 3/2008 | Horvitz | ............. G06F 17/30241 |
| | | | 726/2 |
| 2011/0063443 A1 | 3/2011 | Yang | |
| 2014/0368382 A1 | 12/2014 | Vartanian et al. | |

\* cited by examiner

SYSTEMS AND METHODS FOR PROVIDING LOCATION SPECIFIC CONTENT AND NOTIFICATIONS UTILIZING BEACONS AND DRONES

CROSS-REFERENCE TO RELATED APPLICATIONS

This application is a continuation of U.S. application Ser. No. 14/993,056 filed on Jan. 11, 2016, now U.S. Pat. No. 9,832,751, which claims the benefit of U.S. Provisional Patent Application Ser. No. 62/101,869, filed Jan. 9, 2015 and entitled "Beacon and Drone Utilization to Push Notifications to User Devices," both of which are incorporated herein by reference.

DETAILED DESCRIPTION

Figure 1:
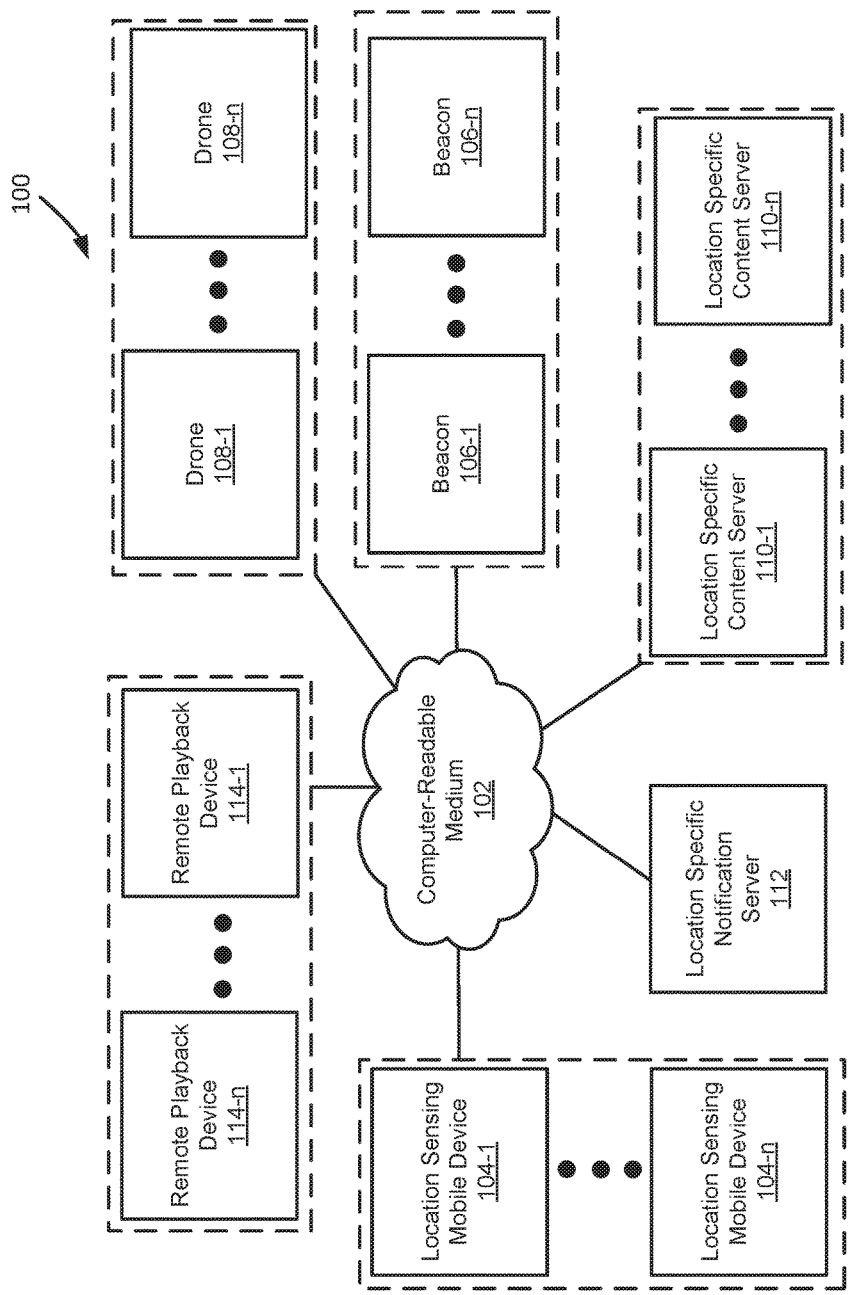
FIG. 1 shows a block diagram of an example of an environment capable of providing location specific content and notifications utilizing beacons and drones.

FIG. 1 shows a block diagram of an example of an environment 100 capable of providing location specific content and notifications utilizing beacons and drones. Generally, the environment 100 can detect a presence of a location sensing mobile device within a venue (e.g., stadium, arena, theatre, etc.) and provide location specific content (e.g., video, audio, pictures, etc.) and/or location specific notifications (e.g., alerts, hazard warnings, advertisements, etc. to the location sensing mobile device based on the detected presence. More specifically, the environment 100 can include beacons positioned throughout the venue, and the location sensing mobile device can receive beacon signals when in range (e.g., 0 m-50 m) of a broadcasting beacon. A presence of the location sensing mobile device can be detected, for example, based on a location of a broadcasting beacon and/or a received beacon signal. The environment 100 includes a computer-readable medium 102, location sensing mobile devices 104-1 to 104-$n$ (individually, the location sensing mobile device 104, collectively, the location sensing mobile devices 104), beacons 106-1 to 106-$n$ (individually, the beacons 106, collectively, the beacons 106), drones 108-1 to 108-$n$ (individually, the drones 108, collectively, the drones 108), location specific content servers 110-1 to 110-$n$ (individually, the location specific content server 110, collectively, the location specific content servers 110), location specific notification server 112, and remote playback devices 114-1 to 114-$n$ (individually, the remote playback devices 114, collectively, the remote playback devices 114).

In the example of FIG. 1, the location sensing mobile devices 104, the beacons 106, the drones 108, the location specific content servers 110, the location specific notification server 112, and the remote playback devices 114, are coupled to the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware. The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

In the example of FIG. 1, the computer-readable medium 102 can include a networked system including several computer systems coupled together, such as the Internet, or a device for coupling components of a single computer, such as a bus. The term "Internet" as used in this paper refers to a network of networks using certain protocols, such as the TCP/IP protocol, and possibly other protocols such as the hypertext transfer protocol (HTTP) for hypertext markup language (HTML) documents making up the World Wide Web (the web). Content is often provided by content servers, which are referred to as being "on" the Internet. A web server, which is one type of content server, is typically at least one computer system, which operates as a server computer system and is configured to operate with the protocols of the web and is coupled to the Internet. The physical connections of the Internet and the protocols and communication procedures of the Internet and the web are well known to those of skill in the relevant art. For illustrative purposes, it is assumed the computer-readable medium 102 broadly includes, as understood from relevant context, anything from a minimalist coupling of the components illustrated in the example of FIG. 1, to every component of the Internet and networks coupled to the Internet. In some implementations, the computer-readable medium 102 is administered by a service provider, such as an Internet Service Provider (ISP).

In various implementations, the computer-readable medium 102 can include technologies such as Ethernet, 802.11, worldwide interoperability for microwave access (WiMAX), 3G, 4G, CDMA, GSM, LTE, digital subscriber line (DSL), etc. The computer-readable medium 102 can further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over computer-readable medium 102 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In a specific implementation, the computer-readable medium 102 can include a wired network using wires for at least some communications. In some implementations the computer-readable medium 102 comprises a wireless network. A "wireless network," as used in this paper can include any computer network communicating at least in part without the use of electrical wires. In various implementations, the computer-readable medium 102 includes technologies such as Ethernet, 802.11, worldwide interoperability for microwave access (WiMAX), 3G, 4G, CDMA, GSM, LTE, digital subscriber line (DSL), etc. The computer-readable medium 102 can further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the computer-readable medium 102 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In a specific implementation, the wireless network of the computer-readable medium 102 is compatible with the 802.11 protocols specified by the Institute of Electrical and Electronics Engineers (IEEE). In a specific implementation, the wireless network of the network 130 is compatible with the 802.3 protocols specified by the IEEE. In some implementations, IEEE 802.3 compatible protocols of the computer-readable medium 102 can include local area network technology with some wide area network applications. Physical connections are typically made between nodes and/or infrastructure devices (hubs, switches, routers) by various types of copper or fiber cable. The IEEE 802.3 compatible technology can support the WEE 802.1 network architecture of the computer-readable medium 102.

The computer-readable medium 102, the location sensing mobile devices 104, the beacons 106, the drones 108, the location specific content servers 110, the location specific notification server 112, and the remote playback devices 114, and other applicable systems, or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface, it will be appreciated that a modem or network interface can be considered to be part of the computer system. The interface can include an analog modem, ISDN modem, cable modem, token ring interface, Ethernet interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

As used in this paper, a server can be implemented as software and/or hardware. Servers can wait and/or respond to requests from other software and/or hardware (or, "clients"). It will be appreciated that clients may implemented on the same hardware and/or software as a server, and/or communicate with a server over a network. Servers can be implemented as computer systems.

In the example of FIG. 1, the location sensing mobile devices 104 function to sense a location (or, presence) within a venue, and receive content and/or notifications specific to that location. For example, the location sensing mobile devices 104 can be smartphones (e.g., iPhone), smartwatches (e.g., Apple Watch), mobile phones, laptop computers, tablet computers, and/or the like. In a specific implementation, the location sensing mobile devices 104 can function to sense an actual presence within a venue. The actual presence can be used to provide the location sensing mobile devices (assuming they also include the functionality of a playback device) location specific content and/or notifications associated with the actual presence and/or a virtual presence, display received content and/or notifications, and/or otherwise interact with the other systems and devices of the environment 100.

In the example of FIG. 1, the location sensing mobile devices 104 can sense an actual presence within a venue based on beacon signals received from one or more beacons 106. In a specific implementation, the location sensing mobile devices 104 can receive a beacon signal from a beacon 106 when in broadcast range of the beacon 106, and sense an actual presence based on one or more beacon attributes of the received signal. For example, the beacon attributes can identify a location portion of the venue. A location portion can, for example, include a predetermined zone within a venue, such as a concession zone, a stage zone, a particular seat location, and/or the like. It will be appreciated that a location portion of a venue can include the entire venue, and/or one or more predetermined portions.

In a specific implementation, a location sensing mobile device 104 can identify a virtual presence within a venue. A virtual presence can identify a location portion within the venue that is different from a location portion associated with an actual presence. For example, a location sensing mobile device 104 can actually be located within a particular location portion (e.g., a concession zone), and the device 104 can sense a virtual location associated with a different location portion (e.g., a stage zone). The location sensing mobile devices 104 can receive and display content and/or notifications specific to an actual presence and/or a virtual presence. This can help, for example, increase an engagement level with content and/or notifications.

In the example of FIG. 1, the beacons 106 function to assist in the identification of location sensing mobile devices 104 within a venue. For example, the beacons can comprise electronic beacons, iBeacons, wireless access points, and/or the like, albeit as adapted in accordance with the teachings herein. In a specific implementation, the beacons 106 can function to generate and/or broadcast beacon signals, and/or otherwise interact with the other systems of the environment 100.

In the example of FIG. 1, the beacons 106 are associated with a particular location portion of a venue and can generate and/or broadcast beacon signals based on one or more beacon attributes. For example, beacon attributes can include a venue identifier, an identifier for an event (e.g., concert, sporting event, film screening, festival, and/or other indoor or outdoor event attend by a group of people), an identifier for an event organizer, a beacon identifier, an identifier for a location portion within a venue, and/or the like.

In a specific implementation, the beacons 106 can detect or otherwise be informed when a location sensing mobile device 104 has indicated reception of an associated beacon signal, and can request authorization to push or otherwise transmit, content and/or notifications to the devices 104. In response to the request, the location sensing mobile 104 can be prompted to download a software application ("app"), if it has not already done so, to receive push notifications. If the app is already downloaded, a location sensing mobile device 104 can be prompted to receive push notifications. If the location sensing mobile device 104 agrees to accept push notifications, the location sensing mobile device 104 can communicate a push authorization acceptance message to the requesting beacon 106, which can forward the acceptance message to one or more servers (e.g., location specific content servers 110 and location specific notification server 112, discussed below).

In the example of FIG. 1, the drones 108 can function to capture sensor data video, pictures, audio, and/or the like) within a venue. For example, the drones 108 can be unmanned aerial vehicles (UAVs) that can be remotely piloted to fly above the venue and/or within an interior location portion of an indoor venue. In a specific implementation, the drones 108 can function to capture sensor data, record sensor data, store sensor data, stream sensor data, optionally serve as mobile beacons 106, and/or otherwise interact with the other systems of the environment 100.

In the example of FIG. 1, each of the drones 108 can be associated with one or more location portions of a venue, and fly above those one or more location portions, or within that interior location portion of an indoor venue. The drones 108 can capture sensor data with one or more on-board and/or remote sensors (e.g., cameras, microphones, and/or the like), store sensor data locally and/or remotely, and/or stream sensor data. For example, the drones 108 can stream sensor data to one or more location sensing mobile device 104 and/or remote playback device 114 (discussed below) in real-time as an event is occurring within a venue. In a specific implementation, the drones 108 can include a beacon 106.

In the example of FIG. 1, the location specific content servers 110 function to deliver location specific content to one or more location sensing mobile devices 104 and/or remote playback devices 114 (discussed below). For example, the location specific content servers 110 can each be associated with one or more location portions of a venue, one or more beacons 106, and/or one or more drones 108. It will be appreciated that the location specific content servers 110 can be embodied in a single server or separate servers. In a specific implementation, the location specific content servers 110 can function to receive sensor data from drones 108, generate and/or store content based on the sensor data, select and/or deliver content to one or more location sensing mobile device 104 and/or remote playback devices 114 (discussed below), manage the beacons 106 and drones 108, and/or otherwise interact with the other systems of the environment 100.

In the example of FIG. 1, the location specific content servers 112 can generate and/or deliver content based on an actual presence and/or a virtual presence. For example, content may be associated with a particular location portion of a venue, and the location specific content servers 110 can deliver content to some or all location sensing mobile devices 104 and/or remote playback devices 114 (discussed below) associated with an actual or virtual presence matching that particular location portion of the venue.

In the example of FIG. 1, the location specific content servers 110 can generate and/or deliver location specific content which is contextually relevant to a location sensing mobile device 104 and/or remote playback device 114 (discussed below) without requesting context information from the devices 104, 114. Context can include, for example, an interest in one or more identified venues (e.g., Fenway Park, Gillette Stadium, etc. and/or events (e.g., sporting events, concerts, etc.), and/or an identified interest level (e.g., none, low, medium, high, etc.) associated with the identified venues and/or events. In a specific implementation, the location specific content servers 110 can infer the context information based on the detected actual and/or virtual presence of the devices 104, 114, and/or based on the beacon attributes of a received beacon signal. For example, the servers 110 can infer an interest in a particular venue based on detection of an actual and/or virtual presence within that particular venue, and/or an interest level based on a venue history and/or an event history. Venue and event histories can include, for example, a number of visits made to a particular venue and/or particular event, and/or an amount of time spent at a particular venue and/or event. Venue and event histories can be generated, for example, based on actual and/or virtual presence detections.

In the example of the FIG. 1, the location specific content servers 110 can alternatively, or additionally, generate and/or deliver content which is contextually relevant to a location sensing mobile device 104 and/or remote playback device 114 (discussed below) based on context information collected from the devices 104, 114. For example, the location specific content servers 110 can prompt the devices 104, 114 for context information, e.g., upon detection of an actual and/or virtual presence.

In the example of FIG. 1, the location specific notification server 112 functions to generate and/or deliver notifications to one or more location sensing mobile device 104 and/or remote playback device 114 (discussed below). In a specific implementation, the location specific notification server 110 can generate notifications based on an actual presence and/or a virtual presence. For example, notifications can be associated with a particular location portion of a venue, and the location specific notification server 112 can deliver notifications to some or all location sensing mobile devices 104 and/or remote playback devices 114 (discussed below) associated with an actual or virtual presence matching that particular location portion of the venue.

In the example of FIG. 1, the location specific notification server 112 can generate and/or deliver location specific notifications which are contextually relevant to a location sensing mobile device 104 and/or remote playback device 114 (discussed below) without requesting context information from the devices 104, 114. In a specific implementation, the location specific notification server 112 can infer the context information based on the detected actual and/or virtual presence of the devices 104, 114, and/or based on the beacon attributes of a received beacon signal. For example, the server 112 can infer an interest in a particular venue based on detection of an actual and/or virtual presence within that particular venue, and/or or an interest level based on a venue history and/or an event history.

In the example of the FIG. 1, the location specific notification server 112 can alternatively, or additionally, select and/or deliver content which is contextually relevant to a location sensing mobile device 104 and/or remote playback device 114 (discussed below) based on context information collected from the device 104, 114. For example, the location specific notification server 112 can prompt the devices 104, 114 for context information, e.g., upon detection of an actual and/or virtual presence.

In the example of FIG. 1, the remote playback devices 114 function to display location specific content and/or notifications. For example, the remote playback devices 114 can be desktop computers, smartphones (e.g., iPhone), smartwatches (e.g., Apple Watch), mobile phones, laptop computers, tablet computers, and/or the like. In a specific implementation, the remote playback devices 114 are remote from the venue and can function to display content and/or notifications as if the remote playback devices 114 were actually located within the venue. For example, the remote playback devices 114 can receive, based on a virtual presence, a real-time sensor data stream from one or more drones 108, content from the location specific content servers 110, and/or notifications from the location specific notification server 112.

Figure 2:
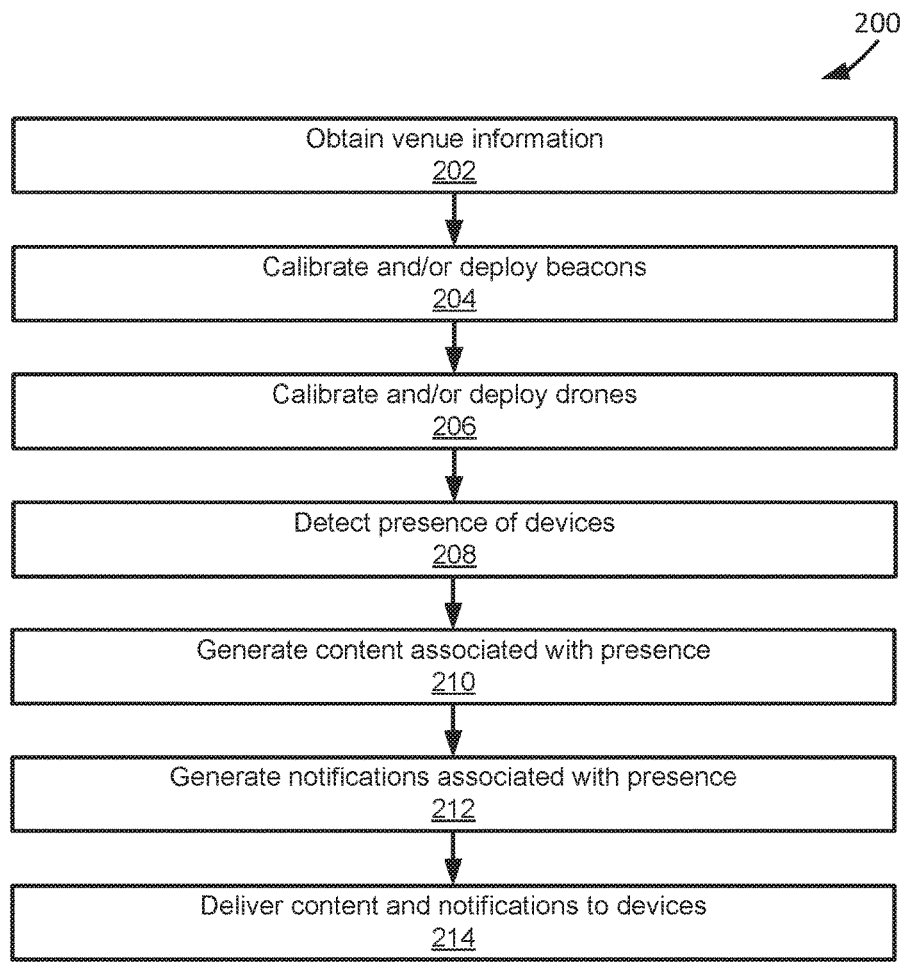
FIG. 2 shows a flowchart of an example method of operation of an environment capable of providing location specific content and notifications utilizing beacons and drones.

FIG. 2 shows a flowchart 200 of an example method of operation of an environment capable of providing location specific content and notifications utilizing beacons and drones. In this and other flowcharts described in this paper, the flowchart illustrates by way of example a sequence of modules. It should be understood the modules can be reorganized for parallel execution, or reordered, as applicable. Moreover, some modules that could have been included may have been removed to avoid providing too much information for the sake of clarity and some modules that were included could be removed, but may have been included for the sake of illustrative clarity.

In the example of FIG. 2, the flowchart 200 starts at module 202 where location specific content servers and/or a location specific notification server retrieve, are sent, or otherwise obtain venue information. Venue information can include, for example, a unique venue identifier, a venue name, a venue owner, one or more predetermined location portions of the venue, beacon positions, drone positions, events associated with the venue, and/or the like. Beacon and/or drone positions can be associated, for example, with one or more location portions of the venue.

In the example of FIG. 2, the flowchart 200 continues to module 204 where the location specific content servers calibrate and/or deploy beacons within a venue based on retrieved and/or stored venue information. Beacons can be calibrated to, for example, identify an organization, a venue, and a zone within the venue prior to being placed within the applicable zone. Alternatively, beacons can be pre-calibrated and the pre-calibrated values can be associated with the venue and/or zone in which they are placed.

In a specific implementation, the beacons can be calibrated according to any protocol related to Bluetooth Low Energy ("BLE"), iBeacon, or other relevant standards to transmit to a location sensing mobile device (e.g., location sensing mobile device 104) a universally unique identifier and limited additional data (e.g., several bytes); the limited additional data may reduce the amount of resources (e.g., power) consumed by the systems and methods herein. The universally unique identifier and limited additional data can be used by the location sensing mobile device to detect an actual presence within a venue and identify associated venue information. Additionally, BLE, iBeacon, etc. calibrated beacons can advantageously utilize a small form factor which can allow a beacon to serve as a mobile beacon when coupled to a drone.

In the example of FIG. 2, the flowchart 200 continues to module 206, where the location specific content servers calibrate and/or deploy drones within a venue based on retrieved and/or stored venue information. Drones can be calibrated to meet regulatory requirements. Drone piloting can be limited to specific drone navigational control cites, or distributed across a network of potential drone pilots. The drones can be calibrated to allow one or more location sensing devices or playback devices to control sensors on a drone. Unless restricted due to regulatory or safety concerns, the drones can be calibrated to allow one or more location sensing devices or playback devices to control maneuvering engines on a drone. In a specific implementation, suggestions regarding drone movement can be received from location sensing devices or playback devices and a dedicated drone pilot can maneuver the drone in accordance with the requests.

In a specific implementation, drones can weigh less than a specified amount (e.g., 55 lbs.) and can be calibrated to help ensure, or increase a likelihood of receiving, an exemption to commercial-use regulatory requirements. For example, the drones can be calibrated to refuse suggestions, or other instruction, to operate above 200 ft., or perform other similarly impermissible actions.

In the example of FIG. 2, the flowchart 200 continues to module 208, where an actual and/or virtual presence of one or more location sensing mobile devices and/or remote playback devices is detected. For example, one or more beacons positioned within the venue can broadcast beacon signals, and an actual presence can be detected based on receipt of one or more beacon signals. By way of further example, a virtual presence can be detected based on input received from a location sensing mobile device and/or remote playback device. For example, the input may specify a particular venue, a particular venue location portion, a particular drone, a particular event, and/or a context.

In the example of FIG. 2, the flowchart 200 continues to module 210, where one or more drones capture location specific sensor data. For example, the location specific content servers can select the one or more drones to capture the sensor data based on drone position within a venue and relative to a sensor acquisition target (assuming the sensor is not an omnidirectional sensor, in which case the target is simply that which is near the drone) or based on drone position relative to an actual or virtual presence within the venue. The location specific content servers can generate location specific content based on the captured sensor data.

In the example of FIG. 2, the flowchart 200 continues to module 212, where the content notification server can generate notifications based on the venue information (e.g., location portions, beacon positions, etc.) and/or the detected actual and/or virtual presence. For example, if a presence is detected in a particular location portion of a venue, the location specific content notification server can generate notifications associated with that particular location portion of the venue.

In the example of FIG. 2, the flowchart 200 continues to module 214, where the location specific content servers and/or the location specific notification server can deliver the generated content and/or notifications to the detected location sensing mobile devices and/or remote playback devices. For example, the retrieved content and/or notifications can be delivered via a network push, and/or other network delivery mechanism. Alternatively, or additionally, the one or more selected drones 108 can deliver the content via a stream, e.g., a real-time stream and/or a recorded stream.

Figure 3:
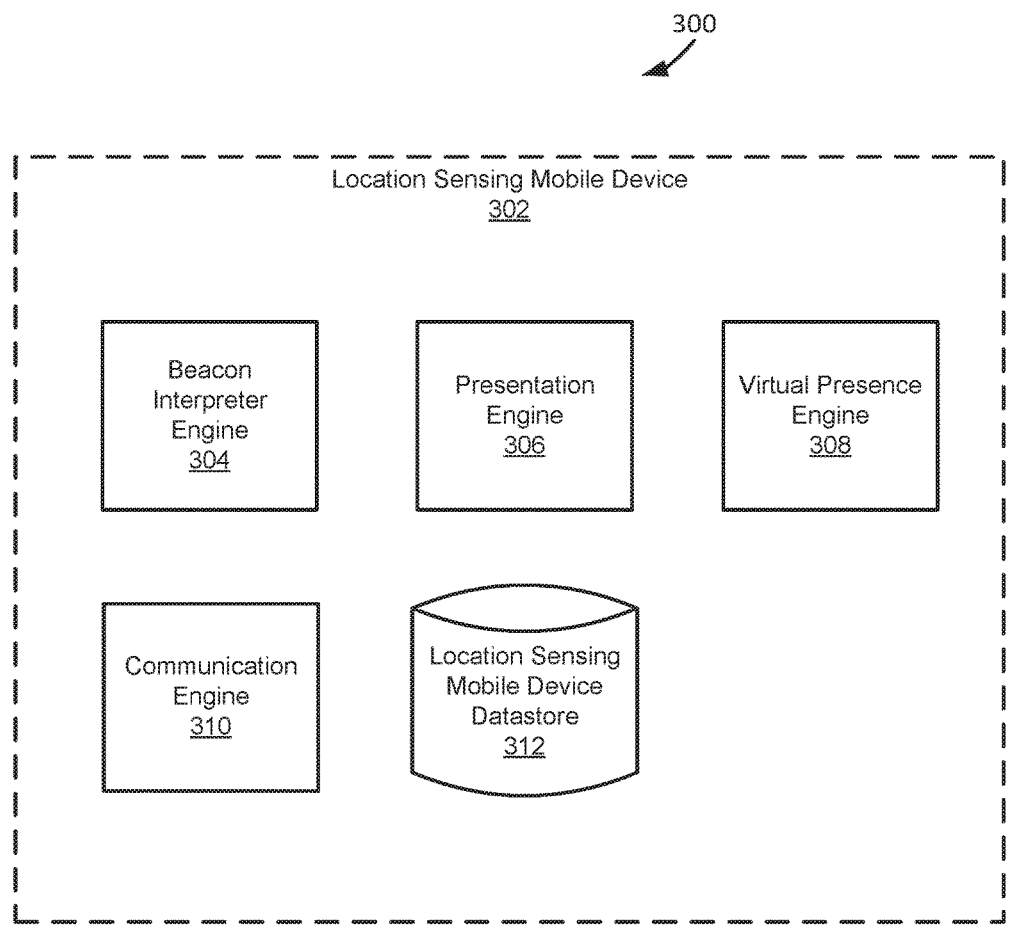
FIG. 3 shows a block diagram of an example of a location sensing mobile device.

FIG. 3 shows a block diagram 300 of an example of a location sensing mobile device 302. In the example of FIG. 3, the example location sensing mobile device 302 includes a beacon interpreter engine 304, a content presentation engine 306, a virtual presence engine 308, a communication engine 310, and a location sensing mobile device datastore 312.

In a specific implementation, the beacon interpreter engine 304 functions to detect, receive, and/or interpret beacon signals received from one or more beacons. For example, the beacon interpreter engine 304 can detect beacon signals when the location sensing mobile device 302 is within a broadcast range of a beacon. In a specific implementation, the beacon interpreter engine 304 can parse beacon signals into one or more identifiable beacon attributes. The beacon interpreter engine 304 can detect an actual presence of the location sensing mobile device 304 based on the detection, receipt, and/or interpretation of the beacon signals.

In various implementations, the beacon interpreter engine 304 can also generate a beacon signal receipt and/or beacon signal interpretation confirmation message. The message can include, for example, a unique identifier associated with the location sensing mobile device 302, an identifier associated with the received beacon signal and/or beacon which generated the received beacon signal, and/or the like.

In a specific implementation, the presentation engine 306 functions to present received content and/or notifications. For example, the presentation engine 306 can output video and/or pictures with an associated display (e.g., an LCD screen) of the location sensing mobile device 302, and/or output audio with one or more speakers of the location sensing mobile device. It may be noted that, while the presentation engine 306 is in some sense optional for a location sensing mobile device, it is expected that most location sensing mobile devices will include playback functionality because that is an expectation of modern consumer electronics products. However, it might be desirable to include location sensing mobile devices with more limited functionality in certain circumstances, such as a low-cost transceiver that could be provided to attendees at a venue.

In a specific implementation, the virtual presence engine 308 functions to select (or, detect) a virtual presence associated with the location sensing mobile device 302. For example, the virtual presence engine 308 may receive input which can be used to select and/or infer a virtual presence. For example, the input may explicitly specify a particular venue, venue location portion, drone, and/or beacon, and the engine 308 can select the virtual presence accordingly. Alternatively, or additionally, the input can include information upon which a particular venue, venue location portion, drone, and/or beacon can be inferred by the engine 308, which the engine 308 can then use to detect a relevant virtual presence. For example, the information can include a context, a natural language request (e.g., "show me the performer currently on stage"), and/or the like.

In a specific implementation, the communication engine 310 functions to send requests to and receive data from one or a plurality of systems. The communication engine 310 can send requests to and receive data from a system through a network or a portion of a network. Depending upon implementation-specific or other considerations, the communication engine 310 can send requests and receive data through a connection, all or a portion of which can be a wireless connection. The communication engine 310 can request and receive location specific content, location specific notifications, beacon signals, authorization requests, and/or other communications from associated systems. Received data can be stored in the location sensing mobile device datastore 312. The communication engine 310 can further transmit beacon signal receipt and/or beacon signal interpretation confirmation messages.

Figure 4A:
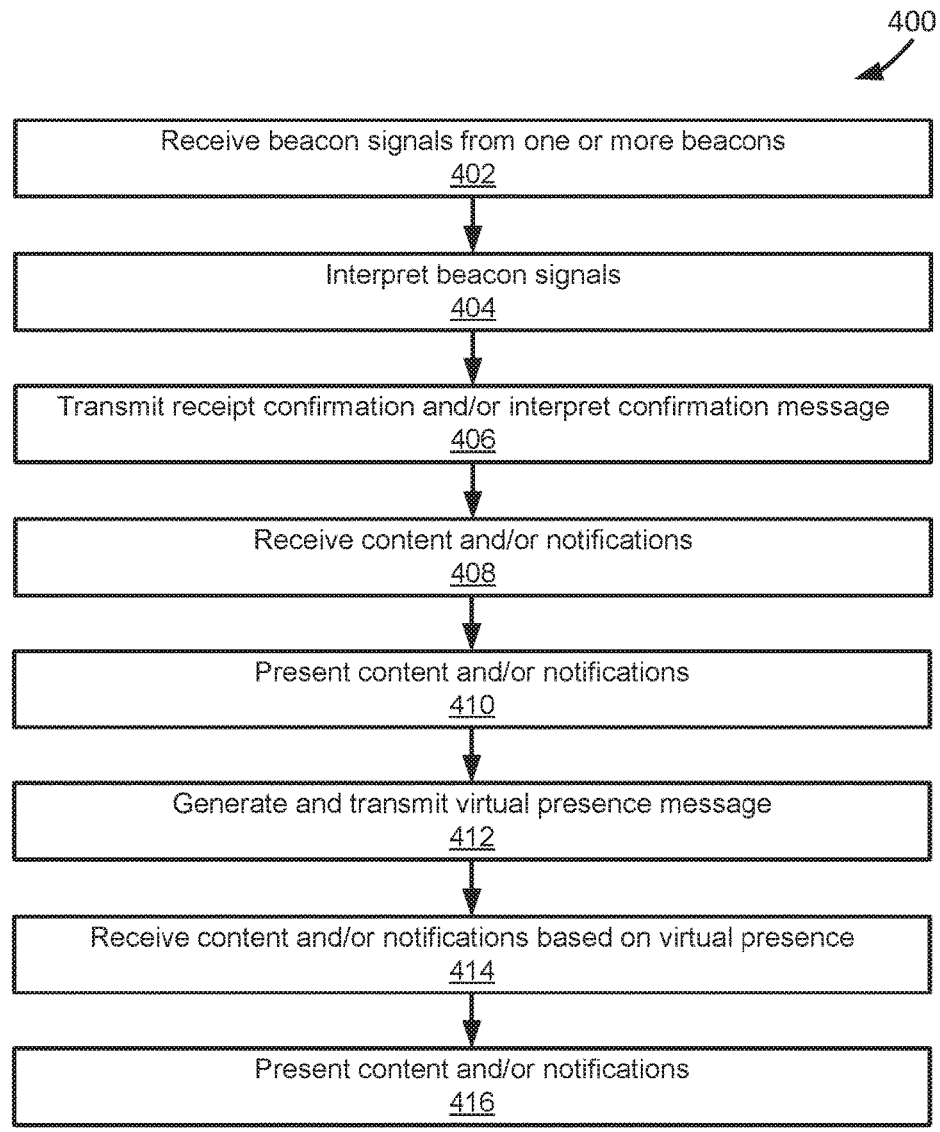
FIG. 4A shows a flowchart of an example method of operation of a location sensing mobile device.

FIG. 4A shows a flowchart 400 of an example method of operation of a location sensing mobile device.

In the example of FIG. 4A, the flowchart 400 starts at module 402 where a location sensing mobile device receives one or more beacon signals from one or more beacons. In a specific implementation, a communication engine can receive the beacon signals.

In the example of FIG. 4A, the flowchart 400 continues to module 404 where the location sensing mobile device interprets the received one or more beacon signals. In a specific implementation, a beacon interpreter engine can interpret the one or more beacon signals.

In the example of FIG. 4A, the flowchart 400 continues to module 406 where the location sensing mobile device generates and transmits beacon signal receipt confirmation messages and/or beacon signal interpretation confirmation messages to location specific content servers and/or a location specific notification server. In a specific implementation, the beacon interpreter engine can generate the message and the communication engine can transmit the messages.

In the example of FIG. 4A, the flowchart 400 continues to module 408 where the location sensing mobile device receives content from the location specific content servers and/or notifications from the location specific notification server. In a specific implementation, the communication engine can receive the content and/or notifications.

In the example of FIG. 4A, the flowchart 400 continues to module 410 where the location sensing mobile device presents the received content and/or the notifications. In a specific implementation, the presentation engine can present the received content and/or notification.

In the example of FIG. 4A, the flowchart 400 continues to module 412 where the location sensing mobile device generates and transmits a virtual presence message to the location specific content servers. In a specific implementation, a virtual presence engine can identify a virtual presence of the location sensing mobile device and can generate a virtual presence message. The communication engine can transmit the virtual presence message to the location specific content servers.

In the example of FIG. 4A, the flowchart 400 continues to module 414 where the location sensing mobile device receives content from the location specific content servers and/or notifications from the location specific notification server based on the virtual presence message. In a specific implementation, the communication engine can receive the content and/or notifications.

In the example of FIG. 4A, the flowchart 400 continues to module 416 where the location sensing mobile device presents received content and/or notifications. In a specific implementation, a presentation engine can present the content and/or notifications.

Figure 4B:
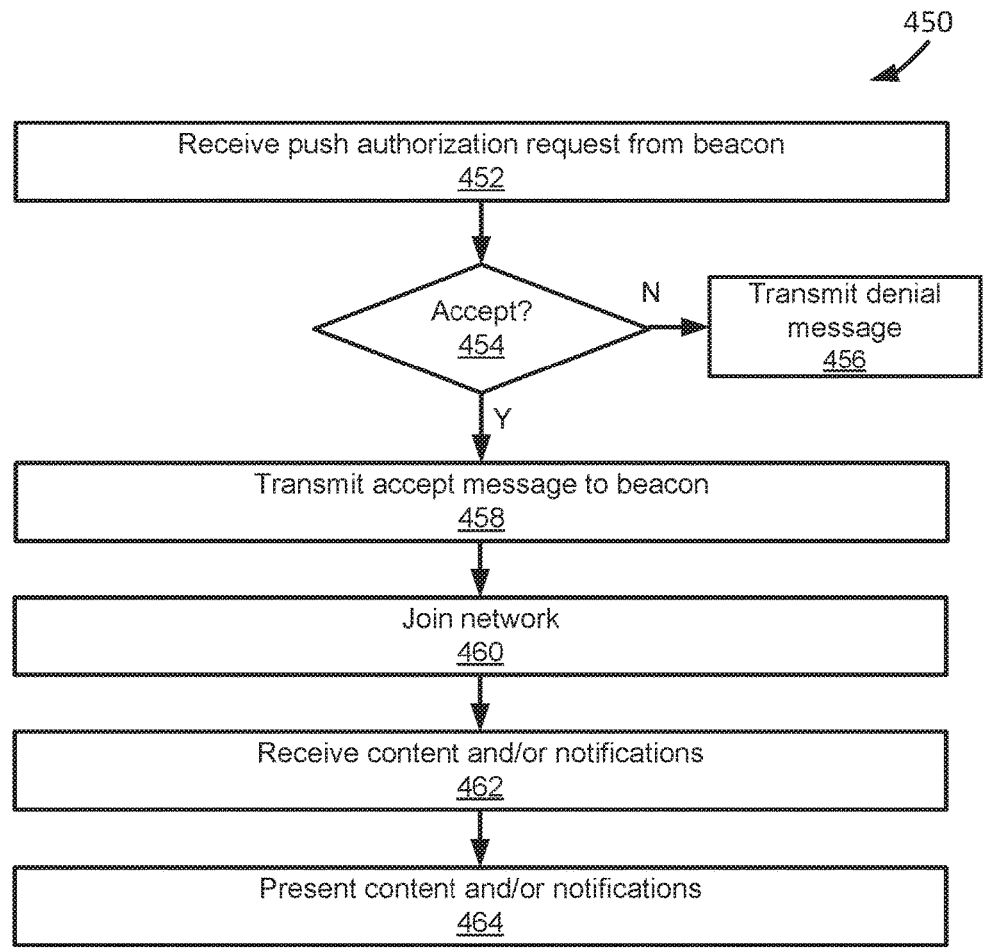
FIG. 4B shows a flowchart of an example method of operation of a location sensing mobile device.

FIG. 4B shows a flowchart 450 of an example method of operation of a location sensing mobile device.

In the example of FIG. 4B, the flowchart 450 starts at module 452 where a location sensing mobile device receives an authorization request (e.g., push authorization request) from a beacon positioned within a venue. In a specific implementation, a communication engine can receive the request.

In the example of FIG. 4B, the flowchart 450 continues to module 454 where the location sensing mobile device can accept or deny the authorization request automatically and/or manually (e.g., in response to user input). For example, the location sensing mobile device can be set to deny or allow some or all requests (e.g., requests associated with particular events, venues, and/or the like). In a specific implementation, a beacon interpreter engine can deny or allow the request.

In the example of FIG. 4B, the flowchart 450 continues to module 456 where, if the request is denied, the location sensing mobile device can generate and transmit a denial message to the beacon, location specific content servers, and/or a location specific notification server. In a specific implementation, the beacon interpreter engine can generate the message and the communication engine can transmit the message.

In the example of FIG. 4B, the flowchart 450 continues to module 458 where, if the request is accepted, the location sensing mobile device can generate and transmit an acceptance message to the beacon, location specific content servers, and/or a location specific notification server. In a specific implementation, the beacon interpreter engine can generate the message and the communication engine can transmit the message.

In the example of FIG. 4B, the flowchart 450 continues to module 460 where the location sensing mobile device joins a network (e.g., WiFi network, LAN, etc.) associated with the venue. For example, the network can facilitate communication between the location sensing mobile device, the location specific content servers, and/or the location specific notification server. In a specific implementation, the communication engine can connect the location sensing mobile device to the network.

In the example of FIG. 4B, the flowchart 450 continues to module 462 where the location sensing mobile device receives content from the location specific content servers and/or notifications from the location specific notification server. In a specific implementation, the communication engine can receive the content and/or notifications.

In the example of FIG. 4B, the flowchart 450 continues to module 464 where the location sensing mobile device presents the received content and/or notifications. In a specific implementation, a presentation engine can present the content and/or notifications.

Figure 5:
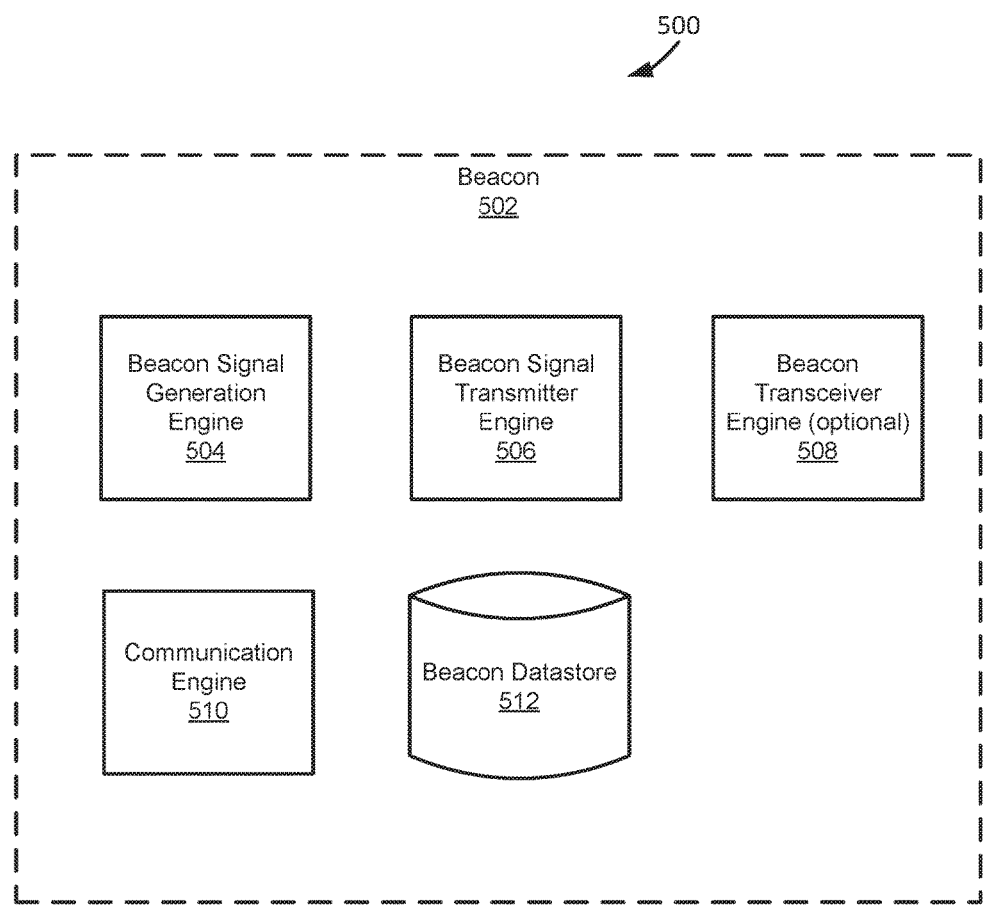
FIG. 5 shows a block diagram of an example of a beacon.

FIG. 5 shows a block diagram 500 of an example of a beacon 502. The example beacon 502 includes a beacon signal generation engine 504, a beacon signal transmitter engine 506, a beacon transceiver engine 508, a communication engine 510, and a beacon datastore 512. It will be appreciated that in the example of FIG. 5, the beacon transceiver engine 508 can be optional.

In a specific implementation, the beacon signal generation engine 504 functions to generate beacon signals for broadcast within a venue. In a specific implementation, the beacon signals can be generated based on one or more beacon attributes stored in the beacon datastore 512. For example, the beacon attributes can include some or all of the following:

Beacon Identifier: Identifies a beacon broadcasting a beacon signal.
Location Portion Identifier: Identifies one or more location portions of a venue associated with a beacon broadcasting a beacon signal. A location portion can include a predetermined zone within a venue, such as a concession zone, a stage zone, a particular seat location, and/or the like.
Venue Identifier: Identifies a venue associated with a beacon broadcasting a beacon signal.
Event Identifier: Identifies an event associated with a venue and/or beacon broadcasting a beacon signal.
Organizer Identifier: identifies an event organizer associated with an event, venue, and/or beacon broadcasting a beacon signal.
Network Identifier: Identifies a network associated with a venue and/or a beacon broadcasting the beacon signal.
Broadcast Distance: Predetermined range for a beacon signal.

In a specific implementation, a beacon signal transmitter engine 506 functions to broadcast beacon signals within a venue. In a specific implementation, the beacon signal transmitter 506 can broadcast the signal based on one or more of the beacon attributes described above.

In a specific implementation, the beacon transceiver engine 508 functions to transmit and receive communications within a venue. In a specific implementation, the transceiver engine 508 can request authorization for a server (e.g., location specific content server, and/or location specific notification server) to push, or otherwise transmit, content and/or notifications to a location sensing mobile device and/or remote playback device. The transceiver can also receive request responses and/or forward responses to an associated server (e.g., location specific content server, and/or location specific notification server).

In a specific implementation, the communication engine 510 functions to send requests to and receive data from one or a plurality of systems. The communication engine 510 can send requests to and receive data from a system through a network or a portion of a network. Depending upon implementation-specific or other considerations, the communication engine 510 can send requests and receive data through a connection, all or a portion of which can be a wireless connection. The communication engine 510 can request and receive messages, and/or other communications from associated systems. Received data can be stored in the location beacon datastore 512. The communication engine 510 can further transmit messages to one or more other computer systems.

Figure 6:
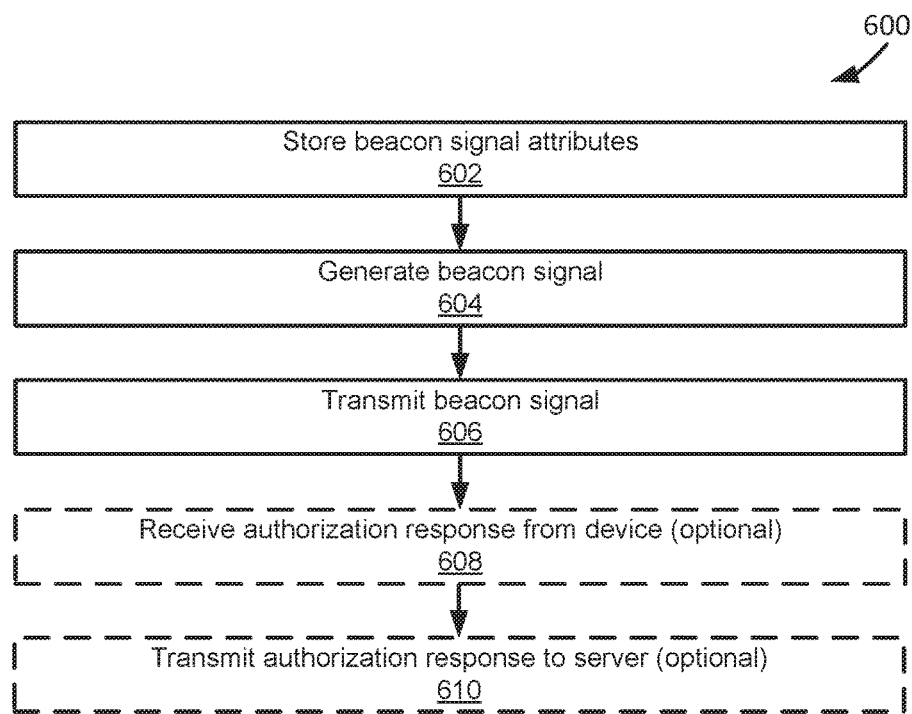
FIG. 6 shows a flowchart of an example method of operation of a beacon.

FIG. 6 shows a flowchart 600 of an example method of operation of a beacon.

In the example of FIG. 6, the flowchart 600 starts at module 602 where a beacon receives and stores one or more beacon attributes. In a specific implementation, a communication engine can receive the one or more beacon attributes and the one or more beacon attributes can be stored in a beacon datastore.

In the example of FIG. 6, the flowchart 600 continues to module 604 where the beacon generates one or more beacon signals. In a specific implementation, a beacon signal generation engine can generate the one or more beacon signals based on the one or more beacon attributes stored in the beacon datastore.

In the example of FIG. 6, the flowchart 600 continues to module 606 where the beacon transmits (or, broadcasts) the one or more beacon signals. In a specific implementation, a beacon signal transmitter engine can transmit the one more beacon signals across a predetermined distance, and/or range, within the venue.

In the example of FIG. 6, the flowchart 600 continues to module 608 where the beacon can optionally receive an authorization response from a location sensing mobile device that received one or more of the beacon signals. In a specific implementation, a beacon transceiver engine can receive the authorization response.

In the example of FIG. 6, the flowchart 600 continues to module 610 where the beacon can optionally transmit the response to location specific content servers, and/or a location specific notification server. In a specific implementation, the beacon transceiver engine can receive can transmit the response.

Figure 7:
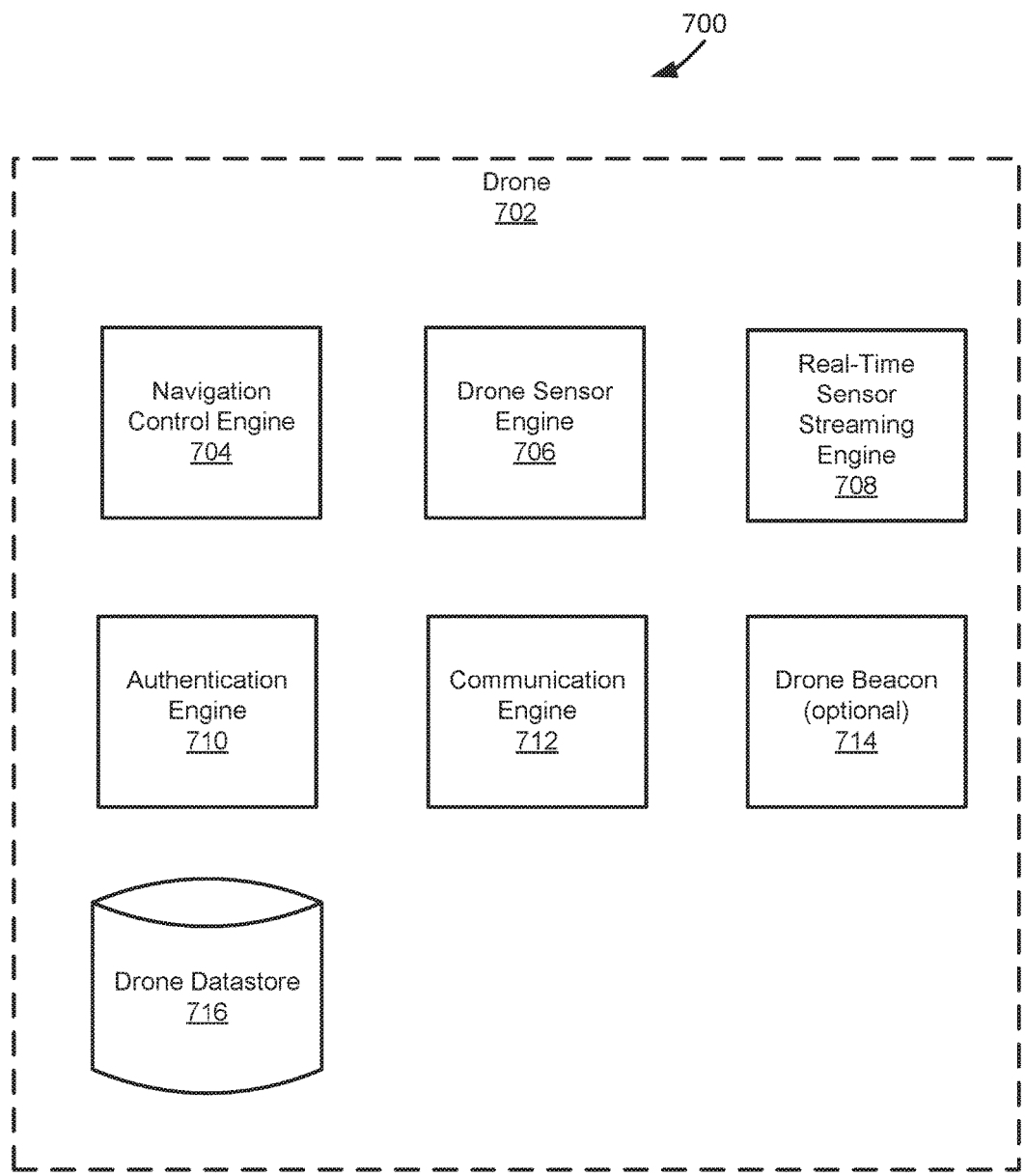
FIG. 7 shows a block diagram of an example of a drone.

FIG. 7 shows a block diagram 700 of an example of a drone 702. The example drone 702 includes a navigation control engine 704, a drone sensor engine 706, a real-time sensor streaming engine 708, an authentication engine 710, a communication engine 712, a drone beacon 714, and a drone datastore 716. It will be appreciated that in the example of FIG. 7, the drone beacon 714 can be optional.

In a specific implementation, the navigation control engine 704 functions to control maneuvering of the drone 702. In various implementation, the navigation control engine 704 can respond to inputs received from designated drone pilots. In a specific implementation, the navigation control engine 704 can respond to inputs received from location sensing mobile devices or remote playback devices. The navigation control engine 704 can additionally be configured to comply with regulatory requirements. For example, the navigation control engine 704 can be configured to ignore, or otherwise refuse to process, inputs that would cause the drone 702 to perform a maneuverer that would violate, or potentially violate, one or more predetermined navigation rules (e.g., a predetermined flight ceiling, velocity, pattern, and/or the like). In a specific implementation, the navigation rules can be stored in the drone datastore 716.

In a specific implementation, the drone sensor engine 706 functions to capture sensor data. For example, a variety of on-board sensors, such as cameras (e.g., a GoPro camera), microphones, and/or the like, can assist in the capture of sensor data. The real-time sensor streaming engine 708 can stream captured sensor data in real-time to one or more location sensing mobile devices, remote playback devices, location specific content servers, and/or the like.

In a specific implementation, the authentication engine 710 functions to authenticate a source of incoming messages. The authentication engine 710 can authenticate incoming messages, for example, based upon authentication data contained within the incoming messages. This can prevent, among other things, "man in the middle" attacks. In some embodiments, rules for appropriately authenticating a source of incoming messages can be defined in rules stored in the drone datastore 716. Authentication can utilize, for example, challenge messages, encryption, 3rd party authentication, and/or the like.

In a specific implementation, the communication engine 712 functions to send requests to and receive data from one or a plurality of systems. The communication engine 712 can send requests to and receive data from a system through a network or a portion of a network. Depending upon implementation-specific or other considerations, the communication engine 712 can send requests and receive data through a connection, all or a portion of which can be a wireless connection. The communication engine 712 can request and receive messages, and/or other communications from associated systems. Received data can be stored in the drone datastore 716.

In the example of FIG. 7, the drone beacon 714 functions to serve as a mobile beacon. The drone beacon 714 can be physically coupled to the drone 702, and can have some or all of the functionality of a beacon 106 described above in FIG. 1 and/or a beacon 502 described above in FIG. 5.

In the example of FIG. 7, the drone datastore 716 can store some or all of the following drone information:

Drone identifier: Unique identifier associated with a drone.

Drone sensors: One or more sensors associated with a drone, e.g., cameras, microphones, and/or the like.

Drone navigation control patterns: Navigation control patterns associated with a drone that can, for example, identify one or more associated location portions within a venue.

Drone navigation rules: one or more predetermined navigation rules (e.g., flight ceiling, velocity, etc.).

Drone triggers conditions and/or actions: One or more triggers conditions that can trigger an action, e.g., trigger a sensor to capture data, stream real-time data, etc.

Figure 8:
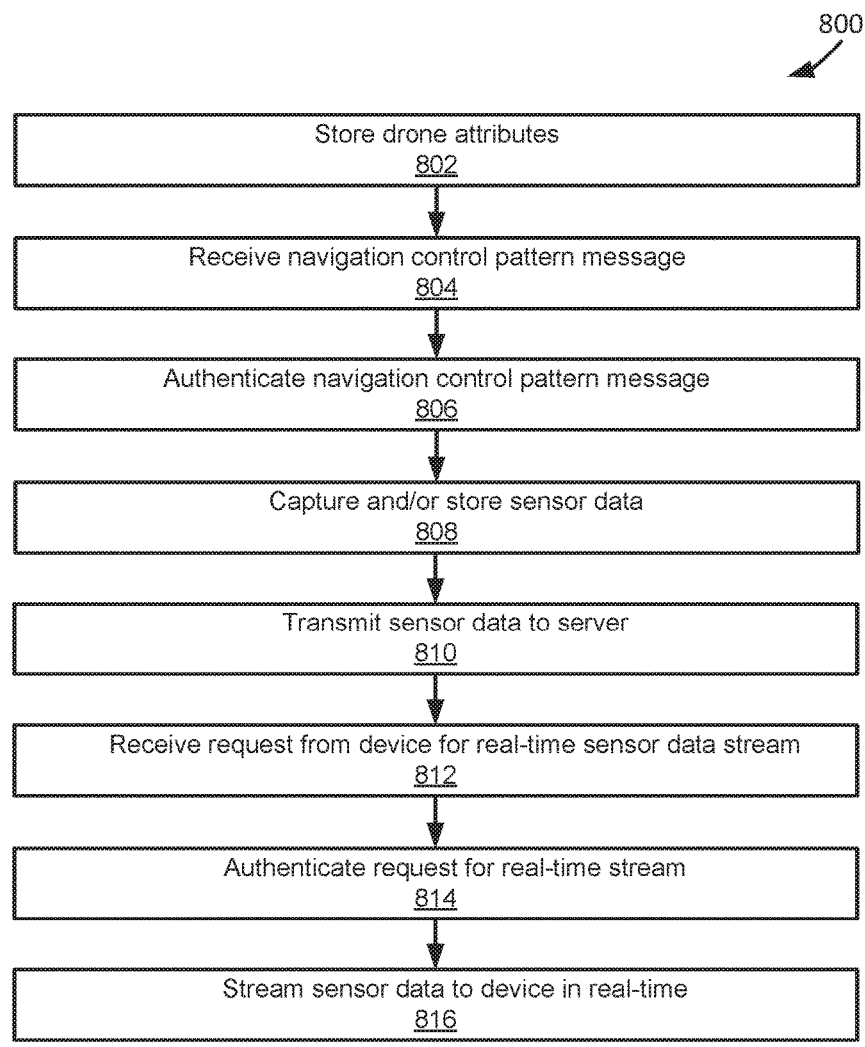
FIG. 8 shows a flowchart of an example method of operation of a drone.

FIG. 8 shows a flowchart 800 of an example method of operation of a drone.

In the example of FIG. 8, the flowchart 800 starts at module 802 where a drone receives one or more drone attributes. In a specific implementation, a communication engine can receive the one or more drone attributes from a location specific content server and store the attributes in a drone datastore. In various implementations, an authentication engine can authentication some or all communications received by the drone, including communications including drone attributes, prior to performing actions in response to the communications.

In a specific implementation, the flowchart 800 continues to modules 804-806 where the drone receives and authenticates a navigation control pattern message. In a specific implementation, the communication module can receive the message and the authentication module can authenticate the message. In response to authentication, the drone can be associated with a location portion of a venue as defined by the navigation control pattern message.

In a specific implementation, the flowchart 800 continues to module 808 where the drone captures sensor data. In a specific implementation, a drone sensor engine can capture the sensor data and store the data in the drone datastore. In step 810, the drone can transmit the sensor data to one or more location specific content servers based on a location portion of the venue in which the sensor data was captured.

In a specific implementation, the flowchart 800 continues to modules 812-814 where the drone receives and authenticates requests from location sensing mobile devices and/or remote playback devices for real-time sensor data streams.

In a specific implementation, the communication engine can receive the requests and the authentication engine can authenticate the requests.

In a specific implementation, the flowchart 800 continues to module 816 where, if the real-time stream request is authenticated, the drone can stream sensor data in real-time to the requesting devices. In a specific implementation, a real-time streaming engine can stream the sensor data.

Figure 9:
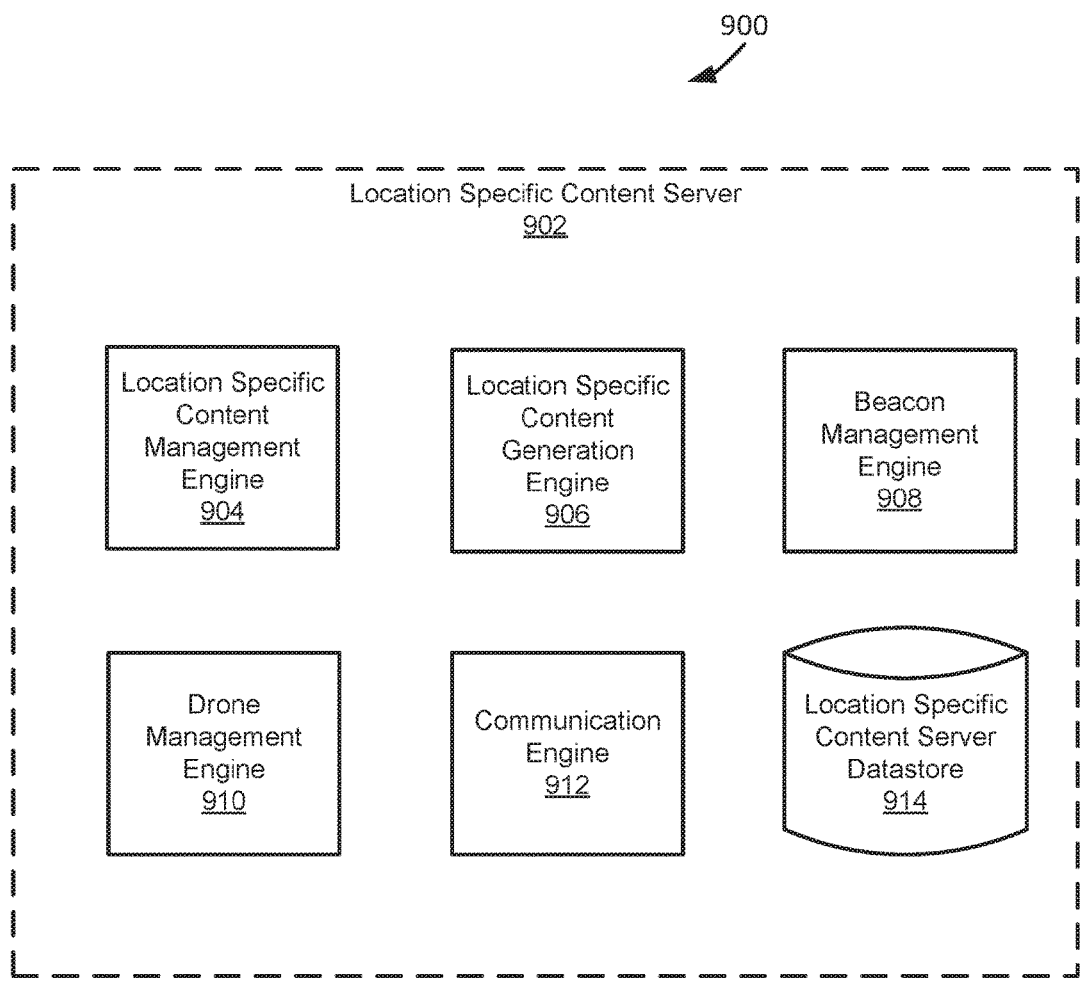
FIG. 9 shows a block diagram of an example of a location specific content server.

FIG. 9 shows a block diagram 900 of an example of a location specific content server 902. The example location specific content server 902 includes a location specific content management engine 904, a location specific content generation engine 906, a beacon management engine 908, a drone management engine 910, a communication engine 912, and a location specific content server datastore 914.

In a specific implementation, the a location specific content management engine 904 functions to create, read, update, delete, or otherwise access content stored in the location specific content datastore 914. The location specific content management engine 904 can perform any of these operations either manually (e.g., by an administrator interacting with a GUI) or automatically (e.g., in response to identification of an actual or virtual presence of a location sensing mobile device within a venue). In a specific implementation, content can include video, pictures, audio, and/or the like.

In a specific implementation, the location specific content generation engine 906 functions to generate and/or retrieve (collectively, generate) location specific content (or, simply, "content") for transmission to location sensing mobile devices and/or remote playback devices. For example, content can be generated from sensor data captured by one or more drones. Generated content can be stored, at least temporarily (e.g., caching for the purposes of transmission to one or more location sensing mobile devices and/or remote playback devices), in the location specific content server datastore 914.

In a specific implementation, the content generation engine 906 can generate content in response to a content request received from a location sensing mobile device and/or a remote playback device. For example, a device can request content associated with a particular drone, and/or one or more location portions of a venue associated with an actual presence and/or a virtual presence.

In a specific implementation, the content generation engine 906 can generate content based on one or more content attributes associated with a location sensing mobile device and/or a remote playback device. Content can be generated based on content attributes automatically (e.g., without receiving a content request) and/or in response to receiving a content request. Content attribute values can be collected from location sensing mobile devices and/or remote playback devices, and/or inferred based on detected actual and/or virtual presences of location sensing mobile devices and/or remote playback devices. Content attribute values can additionally be collected from, and/or inferred based on, resources associated with the location sensing devices and/or the remote playback devices. For example, resources can include social networks (e.g., Facebook, LinkedIn, etc.), online retailers (e.g., Amazon), internet search history (e.g., Google search history), and/or the like.

In a specific implementation, the content attributes can include geographic attributes, demographic attributes, psychographic attributes, and/or behavioristic attributes. Accordingly, example content attributes can include any of the following:

Current Venue: a currently attended venue, e.g., based on an identified actual and/or virtual presence.
Current Venue Location Portion: a current location portion, e.g., based on an identified actual and/or virtual presence.
Current Event: a currently attended event, e.g., based on an identified actual and/or virtual presence
Venue History: a history of previously attended venues, e.g., based on identified actual and/or virtual presences.
Event History: a history of previously attended events, e.g., based on identified actual and/or virtual presences.
Internet activity: search history, online purchase, etc.
Profession
Personal Interests: e.g., sports, hobbies, religion, politics, dating profiles, etc.
Gender
School
Name: First, middle, and/or last name
Age In a specific implementation, the location specific content generation engine 906 can generate and transmit content in response to one or more satisfied content trigger conditions. For example, content trigger conditions can include some or all of the following:

Detected Actual Presence: a detected actual presence of a location sensing mobile device.
Detected Virtual Presence: a detected virtual presence of a location sensing mobile device and/or remote playback device.
Detected Event Activity: a detected event activity, e.g., the start of a sporting event, a performer beginning a concert, etc.
Predetermined Content Schedule: schedule for generating and/or transmitting new content and/or refresh existing content (e.g., every minute, every hour, etc.)

It will be appreciated that some or all of the example content trigger conditions described above can be included in a single trigger condition (e.g., detected actual presence and detected event activity).

In a specific implementation, the beacon management engine 908 functions to calibrate, deploy, and/or otherwise interface with one or more beacons. In a specific implementation, the beacon management engine 906 can generate and/or transmit one or more beacon attributes, e.g., via beacon messages, to the beacons.

In a specific implementation, the drone management engine 910 functions to calibrate, deploy, and/or otherwise interface with one or more drones. In a specific implementation, the drone management engine 910 can generate and/or transmit one or more drone attributes, and/or other drone information, e.g., via drone messages, to the drones.

In a specific implementation, the communication engine 912 functions to send requests to and receive data from one or a plurality of systems. The communication engine 912 can send requests to and receive data from a system through a network or a portion of a network. Depending upon implementation-specific or other considerations, the communication engine 912 can send requests and receive data through a connection, all or a portion of which can be a wireless connection. The communication engine 912 can request and receive messages, and/or other communications from associated systems. Received data can be stored in the location specific content server datastore 914.

Figure 10A:
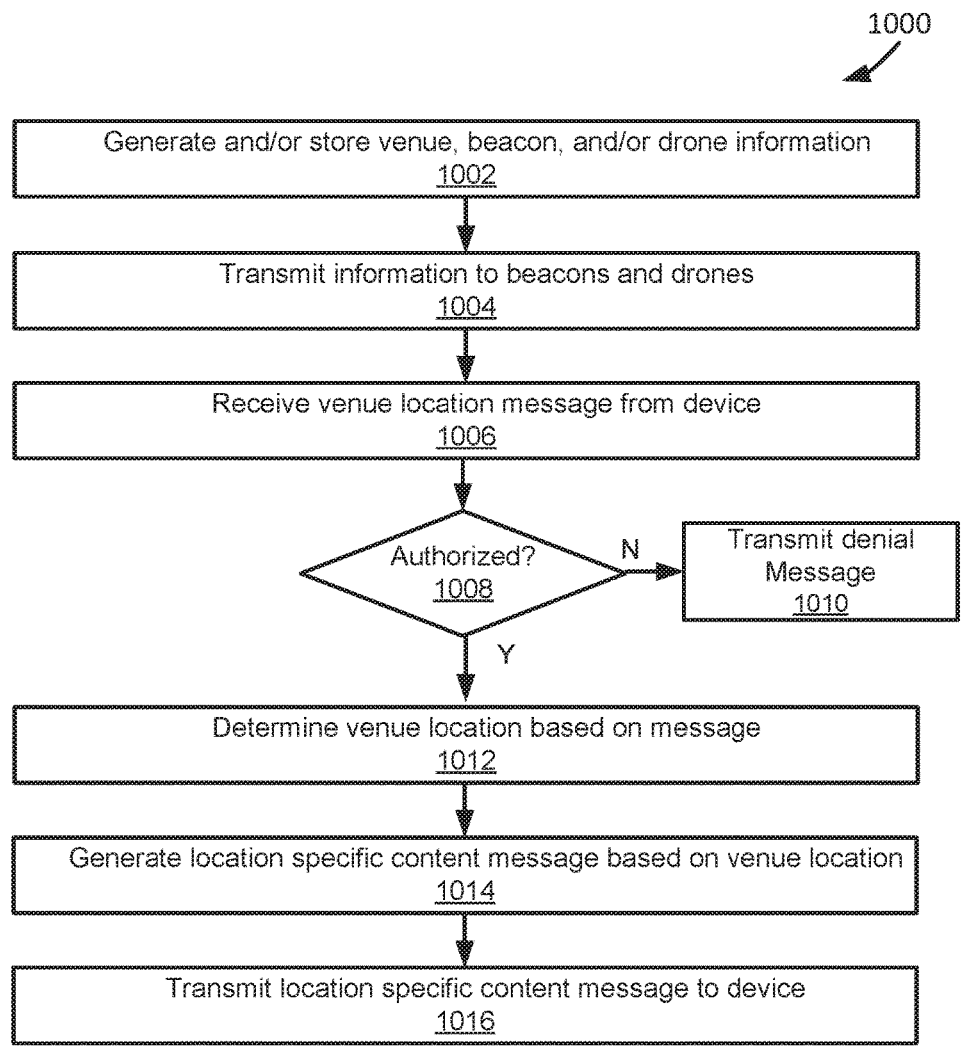
FIG. 10A shows a flowchart of an example method of operation of a location specific content server.

FIG. 10A shows a flowchart 1000 of an example method of operation of a location specific content server.

In the example of FIG. 10A, the flowchart 1000 starts at module 1002, a location specific content server retrieve, are sent, or otherwise obtain venue information, beacon information, and/or drone information. In a specific implementation, a location specific content management engine can obtain the venue information and store the venue information in a location specific content server datastore.

In the example of FIG. 10A, the flowchart 1000 continues to module 1004 where the location specific content server can transmit some or all of the information to one or beacons and/or one or more drones within a venue. In a specific implementation, a beacon management engine can transmit the beacon information to the one or more beacons, and a drone management engine can transmit the venue information and/or drone information to the one or more drones.

In the example of FIG. 10A, the flowchart 1000 continues to module 1006 where the location specific content server can receive a venue location message from a location sensing mobile device and/or remote playback device. The venue location message can include, for example, a virtual presence message, a beacon signal receipt confirmation message, and/or a beacon signal interpretation confirmation message. In a specific implementation, a communication engine can receive the message(s).

In the example of FIG. 10A, the flowchart 1000 continues to module 1008 where the location specific content server can determine if the requesting device is authorized to receive content. In a specific implementation, a location specific content generation engine can make the determination. In step 1010, if authorization is denied, the location specific content server can generate a denial message and the communication engine can transmit the denial message to the requesting device.

In the example of FIG. 10A, the flowchart 1000 continues to module 1012 where, if authorization is approved, the location specific content server can determine a location portion of the venue based on the venue location message. In a specific implementation, the location specific content generation engine can determine the location portion based on information stored in a location specific content server datastore.

In the example of FIG. 10A, the flowchart 1000 continues to module 1014 where the location specific content server can generate a location specific content message based on the location portion of the venue. For example, the location specific content server can retrieve content from the location specific content server datastore and/or request recorded and/or real-time sensor data from one or more drones associated with the determined location portion of the venue. In a specific implementation, the location specific content generation engine can generate the message.

In the example of FIG. 10A, the flowchart 1000 continues to module 1016 where the location specific content server can deliver the content message to the requesting device(s). In a specific implementation, the communication engine can deliver the content message.

Figure 10B:
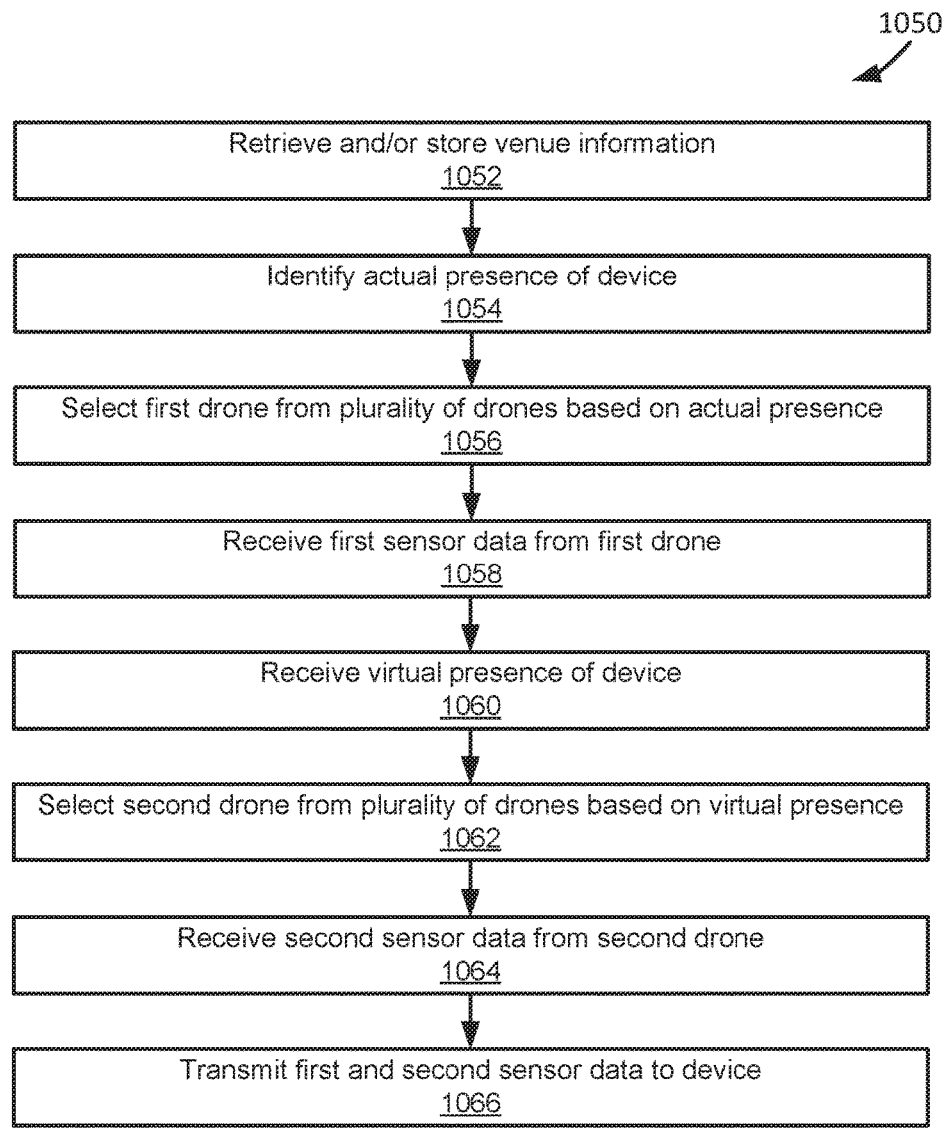
FIG. 10B shows a flowchart of an example method of operation of a location specific content server.

FIG. 10B shows a flowchart 1050 of an example method of operation of a location specific content server.

In the example of FIG. 10B, the flowchart 1050 starts at module 1052 where a location specific content server retrieve, are sent, or otherwise obtain venue information. Venue information can include, for example, one or more location portions of a venue. In a specific implementation a location specific content management engine can obtain the venue information and store the venue information in a location specific content server datastore.

In the example of FIG. 10B, the flowchart 1050 continues to module 1054 where the location specific content server can identify or otherwise be informed of an actual presence of a location sensing mobile device within the venue. In a specific implementation, the location specific content server can detect the actual presence based on beacon signal receipt and/or beacon signal interpretation confirmation messages received from the location sensing mobile devices and/or authorization request messages received from one or more beacons within the venue.

In the example of FIG. 10B, the flowchart 1050 continues to module 1056 where the location specific content server can select a first drone from a plurality of drones based on the actual presence. In a specific implementation, a location specific content generation engine can select the first drone based on association with a location portion of the venue matching the detected actual presence.

In the example of FIG. 10B, the flowchart 1050 continues to module 1058 where the location specific content server can receive first sensor data from the first drone. In a specific implementation, the communication engine and/or the location specific content generation engine can receive the sensor data and store the first sensor data in the location specific content server datastore.

In the example of FIG. 10B, the flowchart 1050 continues to module 1060 where the location specific content server can receive a virtual presence of the location sensing mobile device. In a specific implementation, the virtual presence can be received, and/or inferred, by the location specific content generation engine, e.g., based on one or more messages (e.g., a virtual presence message) received from the location sensing mobile device by the communication engine.

In the example of FIG. 10B, the flowchart 1050 continues to module 1062 where the location specific content server can select a second drone based the virtual presence. In a specific implementation, the location specific content generation engine can select the second drone based on association with a location portion of the venue matching the virtual presence.

In the example of FIG. 10B, the flowchart 1050 continues to module 1064 where the location specific content server can receive second sensor data from the second drone. In a specific implementation, the communication engine and/or the location specific content generation engine can receive the second sensor data and store the second sensor data in the location specific content server datastore.

In the example of FIG. 10B, the flowchart 1050 continues to module 1066 where the location specific content server can deliver the first and/or second sensor data to the location sensing mobile device. In a specific implementation, the communication engine can deliver the sensor data via one or more content messages and/or streams.

Figure 11:
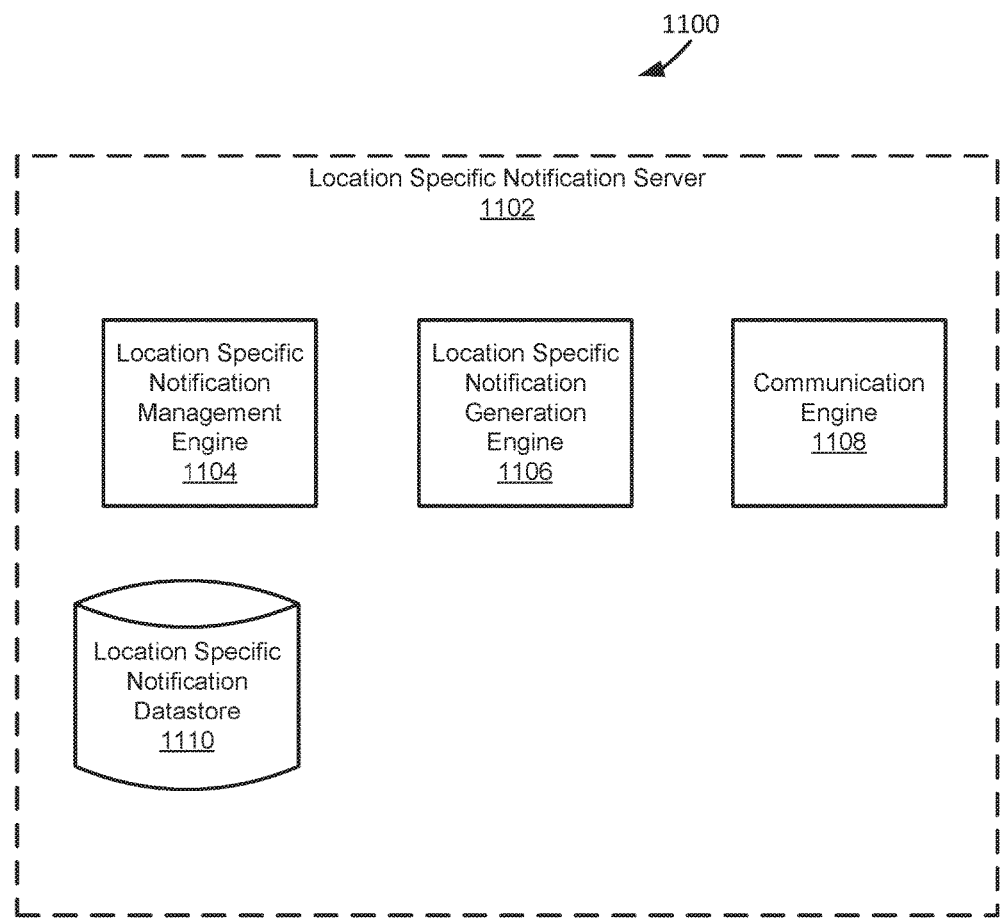
FIG. 11 shows a block diagram of an example of a location specific notification server.

FIG. 11 shows a block diagram 1100 of an example of a location specific notification server 1102. The example location specific notification server 1102 includes a location specific notification management engine 1104, a location specific notification generation engine 1106, a communication engine 1108, and a location specific notification server datastore 1110.

In the example of FIG. 11, the location specific notification management engine 1104 functions to create, read, update, delete, or otherwise access notifications stored in the location specific notification datastore 1110. The location specific notification management engine 1104 can perform any of these operations either manually (e.g., by an administrator interacting with a GUI) or automatically (e.g., in response to a detection an actual or virtual presence of a location sensing mobile device). In a specific implementation, notifications can include alerts, hazard warnings, advertisements, games, polls, contests, puzzles, social communications from other event attendees, what others are saying about the event, information about a performer or speaker at the event, interactive content, and/or the like.

In a specific implementation, the notification generation engine 1106 functions to generate and/or retrieve (collectively, generate) location specific notifications (or, simply, "notifications") for transmission to location sensing mobile devices and/or remote playback devices. Generated notifications can be stored, at least temporarily (e.g., caching for the purposes of transmission to one or more location sensing mobile devices and/or remote playback devices), in the location specific notification server datastore 1110.

In a specific implementation, the notification generation engine 1106 can generate notifications in response to a notification request received from a location sensing mobile device and/or a remote playback device. For example, a device can request notifications associated with one or more location portions of a venue associated with an actual presence and/or a virtual presence.

In a specific implementation, the notification generation engine 1106 can generate notifications based on one or more notification attributes associated with a location sensing mobile device and/or remote playback device. Notifications can be generated based on notification attributes automatically (e.g., without receiving a notification request) and/or in response to a received notification request. Notification attribute values can be collected from location sensing mobile devices and/or remote playback devices, and/or inferred based on detected actual and/or virtual presences of location sensing mobile devices and/or remote playback devices. Notification attribute values can additionally be collected from, and/or inferred based on, resources associated with the location sensing devices and/or the remote playback devices. For example, resources can include social networks (e.g., Facebook, LinkedIn, etc.), online retailers Amazon), internet search history (e.g., Google search history), and/or the like.

In a specific implementation, the notification attributes can include geographic attributes, demographic attributes, psychographic attributes, and/or behavioristic attributes. Accordingly, example notification attributes can include any of the following:

Current Venue: a currently attended venue, e.g., based on an identified actual and/or virtual presence.
Current Venue Location Portion: a current location portion, e.g., based on an identified actual and/or virtual presence.
Current Event: a currently attended event, e.g., based on an identified actual and/or virtual presence
Venue History: a history of previously attended venues, e.g., based on identified actual and/or virtual presences.
Event History: a history of previously attended events, e.g., based on identified actual and/or virtual presences.
Internet Activity: search history, online purchase, etc.
Profession
Personal Interests: e.g., sports, hobbies, religion, politics, dating profiles, etc.
Gender
School
Name: First, middle, and/or last name
Age In the example of FIG. 11, the location specific generation engine 1106 can generate and transmit notifications in response to one or more satisfied notification trigger conditions. For example, notification trigger conditions can include some or all of the following:

Actual Presence: an identified actual presence of a location sensing mobile device.
Virtual Presence: an identified virtual presence of a location sensing mobile device and/or remote playback device.
Hazard: a hazard (e.g., fire) detected within a venue and/or location portion of a venue.
Predetermined Notification Schedule: schedule for generating and/or transmitting new notifications and/or refresh existing notifications (e.g., every minute, every hour, etc.)

It will be appreciated that some or all of the example notification trigger conditions described above can be included in a single trigger condition (e.g., detected actual presence and detected hazard).

In a specific implementation, the communication engine 1108 functions to send requests to and receive data from one or a plurality of systems. The communication engine 1108 can send requests to and receive data from a system through a network or a portion of a network. Depending upon implementation-specific or other considerations, the communication engine 1108 can send requests and receive data through a connection, all or a portion of which can be a wireless connection. The communication engine 1108 can request and receive messages, and/or other communications from associated systems. Received data can be stored in the location specific notification server datastore 1110.

Figure 12:
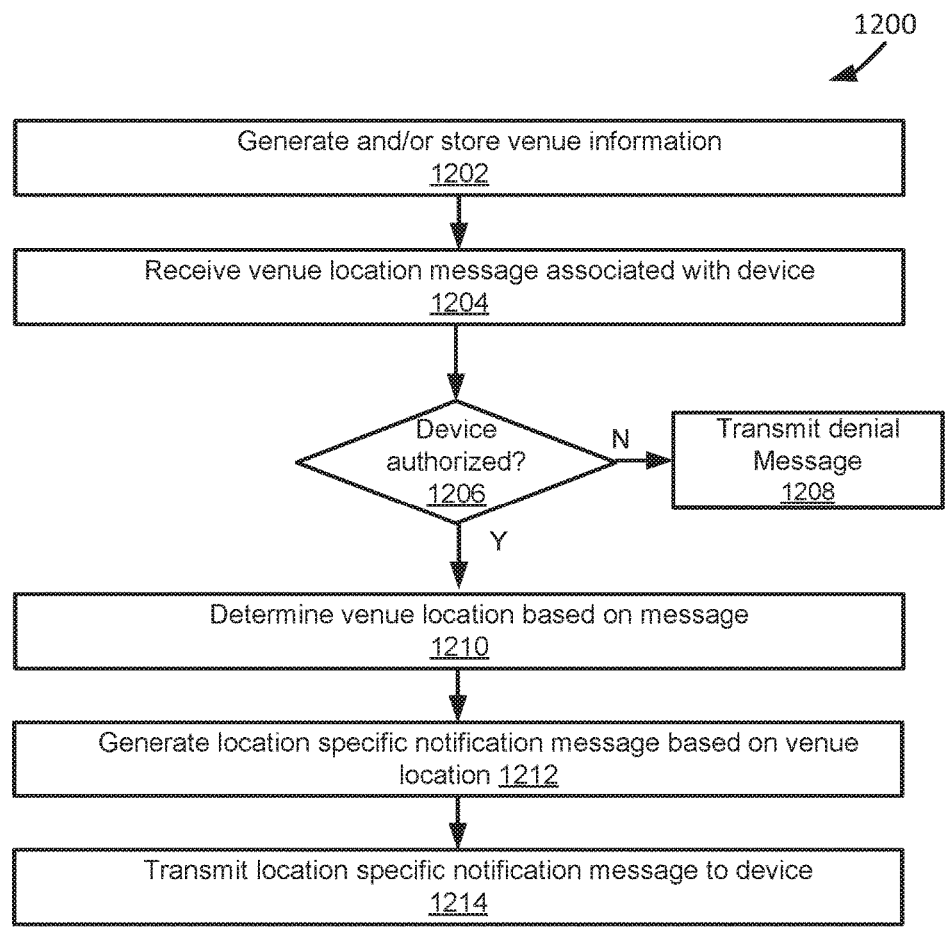
FIG. 12 shows a flowchart of an example method of operation of a location specific notification server.

FIG. 12 shows a flowchart 1200 of an example method of operation of a location specific notification server.

In the example of FIG. 12, the flowchart 1200 starts at module 1202 where a location specific notification server can retrieve, are sent, or otherwise obtain venue information, beacon information, and/or drone information. In a specific implementation, a location specific notification management engine can obtain the venue information and store the venue information in a location specific notification server datastore.

In step 1204, the location specific notification server can receive a venue location message from a location sensing mobile device. The venue location message can include, for example, a virtual presence message, a beacon signal receipt confirmation message and/or a beacon signal interpretation confirmation message. In a specific implementation, a communication engine can receive the message(s).

In the example of FIG. 12, the flowchart 1200 continues to module 1206 where the location specific notification server can determine if the requesting device is authorized to receive notifications. In a specific implementation, a location specific notification generation engine can make the determination. In step 1208, if authorization is denied, the location specific notification server can generate a denial message and the communication device can transmit the denial message to the requesting device.

In the example of FIG. 12, the flowchart 1200 continues to module 1210 where, if authorization is approved, the location specific notification server can determine a location portion of the venue based on the venue location message. In a specific implementation, the location specific notification generation engine can determine based information stored in a location specific notification server datastore.

In the example of FIG. 12, the flowchart 1200 continues to module 1212 where the location specific notification server can generate a location specific notification message based on the location portion of the venue. For example, the location specific notification server can retrieve notifications from the location specific notification server datastore and/or request recorded and/or real-time data from one or more drones associated with the determined location portion of the venue. In a specific implementation, the location specific notification generation engine can generate the message.

In the example of FIG. 12, the flowchart 1200 continues to module 1214 where the location specific notification server can deliver the notification message to the requesting device(s). In a specific implementation, the communication module can deliver the notification message.

Figure 13:
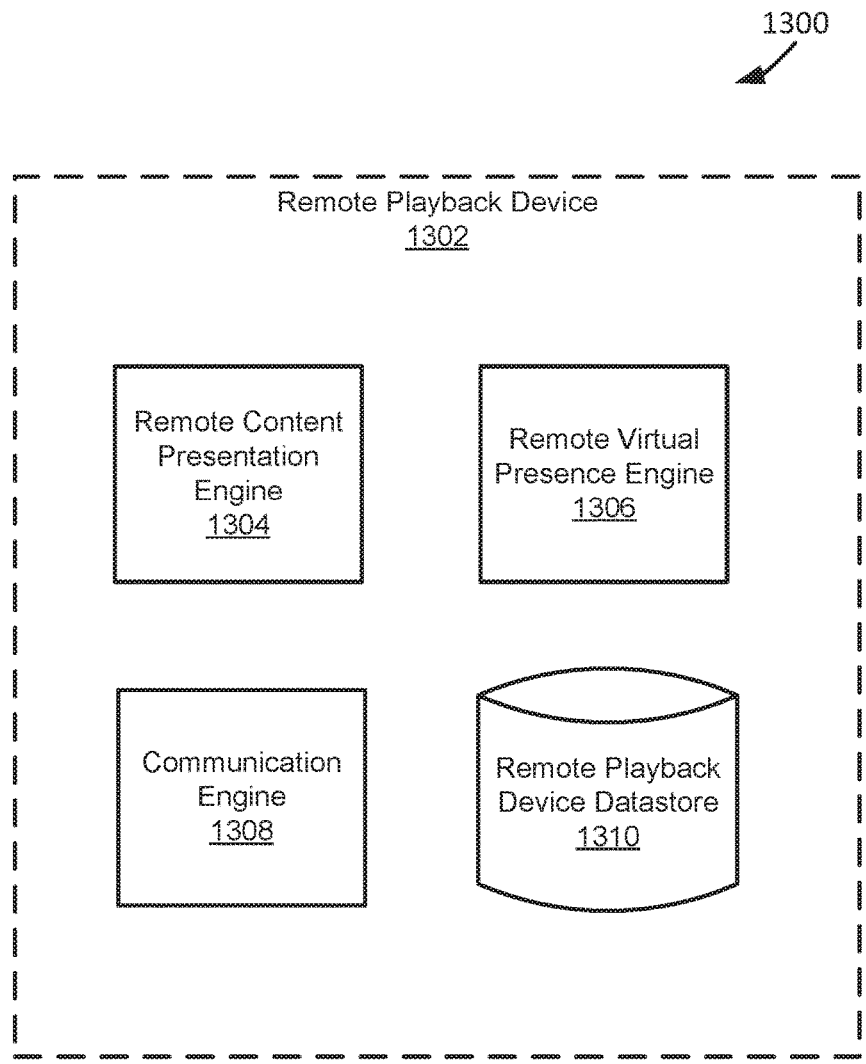
FIG. 13 shows a block diagram of an example of a remote playback device.

FIG. 13 shows a block diagram 1300 of an example of a remote playback device 1302. The example remote playback device 1302 includes a remote content presentation engine 1304, a remote virtual presence engine 1306, a communication engine 1308, and a remote playback device datastore 1310.

In a specific implementation, the remote content presentation engine 1304 functions to present received content and/or notifications. For example, the remote presentation engine 1304 may output video and/or pictures with an associated display (e.g., an LCD screen) of the remote playback device 1302, and/or output audio with one or more speakers of the remote playback device 1302.

In a specific implementation, the remote virtual presence engine 1306 functions to select (or, detect) a virtual presence associated with the remote playback device 1302. For example, the virtual presence engine 1306 may receive input that can be used to select and/or infer a virtual presence. For example, the input can explicitly specify a particular venue, venue location portion, drone, and/or beacon, and the engine 1306 can select the virtual presence accordingly. Alternatively, or additionally, the input can include information upon which a particular venue, venue location portion, drone, and/or beacon can be inferred by the engine 1306, which the engine 1306 can use to select a relevant virtual presence. For example, the information can include a context, a natural language request (e.g., "show me the performer currently on stage"), and/or the like.

In a specific implementation, the communication engine 1308 functions to send requests to and receive data from one or a plurality of systems. The communication engine 1308 can send requests to and receive data from a system through a network or a portion of a network. Depending upon implementation-specific or other considerations, the communication engine 1308 can send requests and receive data through a connection, all or a portion of which can be a wireless connection. The communication engine 1308 can request and receive messages, and/or other communications from associated systems. Received data can be stored in the location specific notification server datastore 1310. The communication engine 1308 can further transmit messages.

Figure 14:
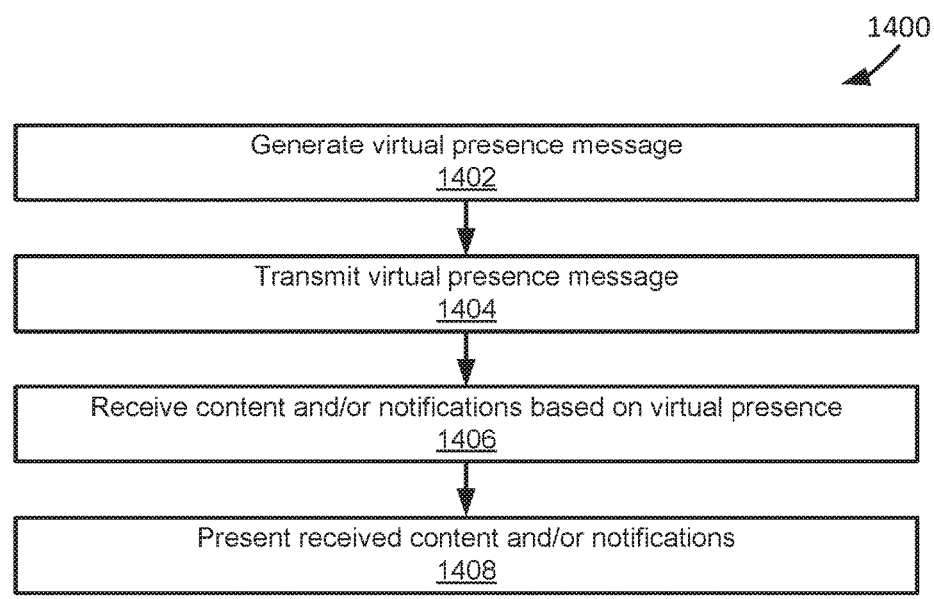
FIG. 14 shows a flowchart of an example method of operation of a remote playback device.

FIG. 14 shows a flowchart 1400 of an example method of operation of a remote playback device.

In the example of FIG. 14, the flowchart 1400 starts at module 1402 where a remote playback device can generate a virtual presence message. In a specific implementation, a remote virtual presence engine can identify a virtual presence of the remote playback device and generate a virtual presence message.

In the example of FIG. 14, the flowchart 1400 continues to module 1404 where the remote playback device can transmit the virtual presence message to location specific content servers. In a specific implementation, a communication engine can transmit the virtual presence to the location specific content servers.

In the example of FIG. 14, the flowchart 1400 continues to modules 1406-1408 where the remote playback device can receive and present content retrieved from the location specific content servers based on the virtual presence message. In a specific implementation, the communication engine can receive the content and a remote presentation engine can present the content.

Figure 15:
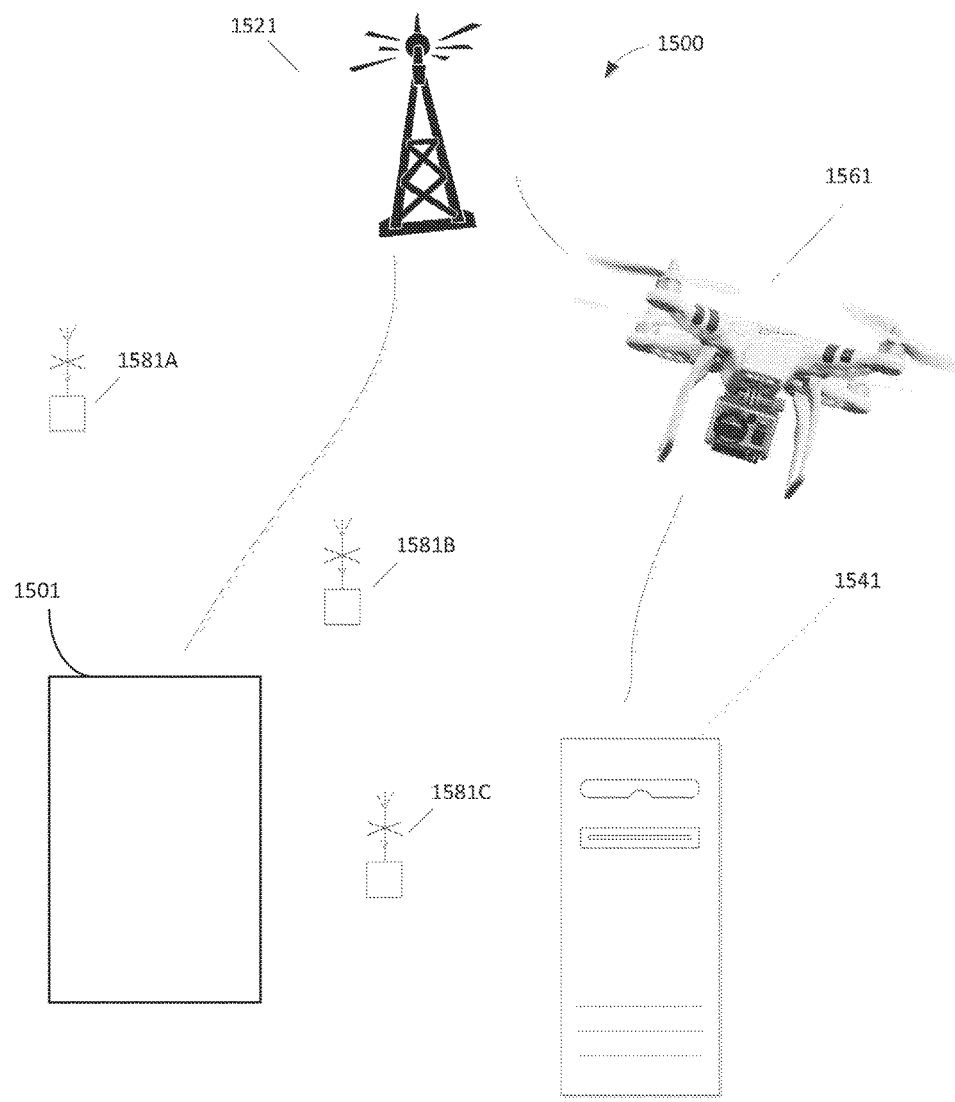
FIG. 15 shows an example system for utilizing beacons and drones to push notifications to a user attending an event at a venue.

FIG. 15 shows an example system 1500 for utilizing beacons and drones to push notifications to a user attending an event at a venue. The system 1500 can be implemented at a venue and can include beacons 1581 strategically placed around the venue that can communicate with one or more drones 1561. FIG. 15 illustrates a single user device 1501, a single drone 1561, and three beacons 1581A-C, however one or more of each of these devices can be used. In some examples, a drone 161 can transport a beacon 1581. An event can be a concert, a sporting event, a festival, or other indoor or outdoor event at a venue attended by a group of people. The beacons 1581 can be wireless communication devices, such as, for example, Bluetooth devices. The beacons 1581 can communicate a wireless signal over a predetermined distance with each other or one or more other user devices 1501. A user device 1501 can be, for example, a smart phone, a mobile phone, a tablet computer, and the like. A drone 1561 can be an unmanned aerial vehicle that can be remotely piloted to fly above the venue or within an interior space of an indoor venue. Each drone 1561 can include a camera or other recording device for recording one or more of audio and/or video, and taking photographs, while the event is ongoing. The recorded pictures, audio, and/or video are collectively referred to as "recorded content."

When a user approaches the venue with his/her user device 1501, one or more of the beacons 1581 can detect that a user device 1501 is within range, and, when detected, a beacon 1581 can solicit authorization to push notifications to the user device 1501. For example, the detecting beacon 1581 can communicate a push authorization request to the user device 1501. In response to the request, a user device 1501 can prompt the user to download a software application ("app"), if the user has not already done so, to receive push notifications. If the app is already downloaded, a user device 1501 can prompt the user to receive push notifications. If the user agrees to accept push notifications, a user device 1501 can communicate a push authorization acceptance message to the soliciting beacon 1581, which can forward the acceptance message to a server 1541. The server 1541 can then push notifications to the user device 1501.

For example, the server 1541 can communicate with one or more of the drones 1561 flying over a concert venue and recording pictures, audio, and/or video of the concert and the crowd attending the concert. For some or all of the user devices 1501 that have agreed to accept push notifications, the server 1541 can push notifications to the accepting user devices 1501 that can include pictures, audio, and/or video recorded by one or more of the drones. The server 1541 can also push other types of rich media content to the user device 1501, including, for example, advertisements, games, polls, contests, puzzles, social communications (e.g., tweets) from other event attendees, what others are saying about the event, information about a performer or speaker at the event, interactive content, and the like.

In another example, the server 1541 can track the location of the user devices 1501 via UPS, triangulation of signals communicated by each user device 1501 with one or more beacons 1581, and the like. The server 1541 can determine which, if any, of the drones 1561 is recording content pictures, audio, and/or video of the event closest to the user device 1501 or in the direction of the user device 1501. The server 1541 can use the geo-location data to push notifications to the user device to include recorded audio, video, and/or images to provide an aerial view of the user. The server 1541 can also prompt the user, via the app, to select one or more of the drones 1581. In response to the selection, the server 1541 can push audio, video, and/or images to the user device 1501 from the selected drone(s) 1561. The server 1541 can also push advertisements to the user based on a number of factors, including, for example, the type of event, a demographic profile for event attendees, a geographic location of the event (e.g., Southwest, Northeast, city, state, county, etc.), and the like.

Additionally, a user is not required to be physically present at an event while the event is ongoing to receive push notifications from server 1541. The user can subscribe or request to receive the push notifications while at any other location. In some instances, the server 1541 can push notifications at the same time as the event is occurring live at the venue. In other instances, the server 1541 can wait to push the notifications until after the event is over.

Advantageously, the example embodiments can utilize beacons and drones to push notifications to one or more user devices. In some instances, the example embodiments can provide the user with content recorded by one or more drones to enhance the user's experience of an event.

With further reference to FIG. 15, depicted can be a high level illustration of some of the elements of a sample system in accordance with example implementations. The system 1500 can include a server 1541, a user computing device 1501, an application on the server 1541, an application on the user device 1501, a drone 1561, a beacon 1581, or a combination of all of these. The server 1541, the user computing device 1501, the drone 1561, and/or the beacon 1581 can each comprises specific implementation of a computer system 1600 (see FIG. 16, below). In addition, the application can be obtained in a variety of ways such as from an app store, from a web site, from a store WiFi system, etc. There can be various versions of the application to take advantage of the benefits of different computing devices, different languages and different API platforms.

Figure 16:
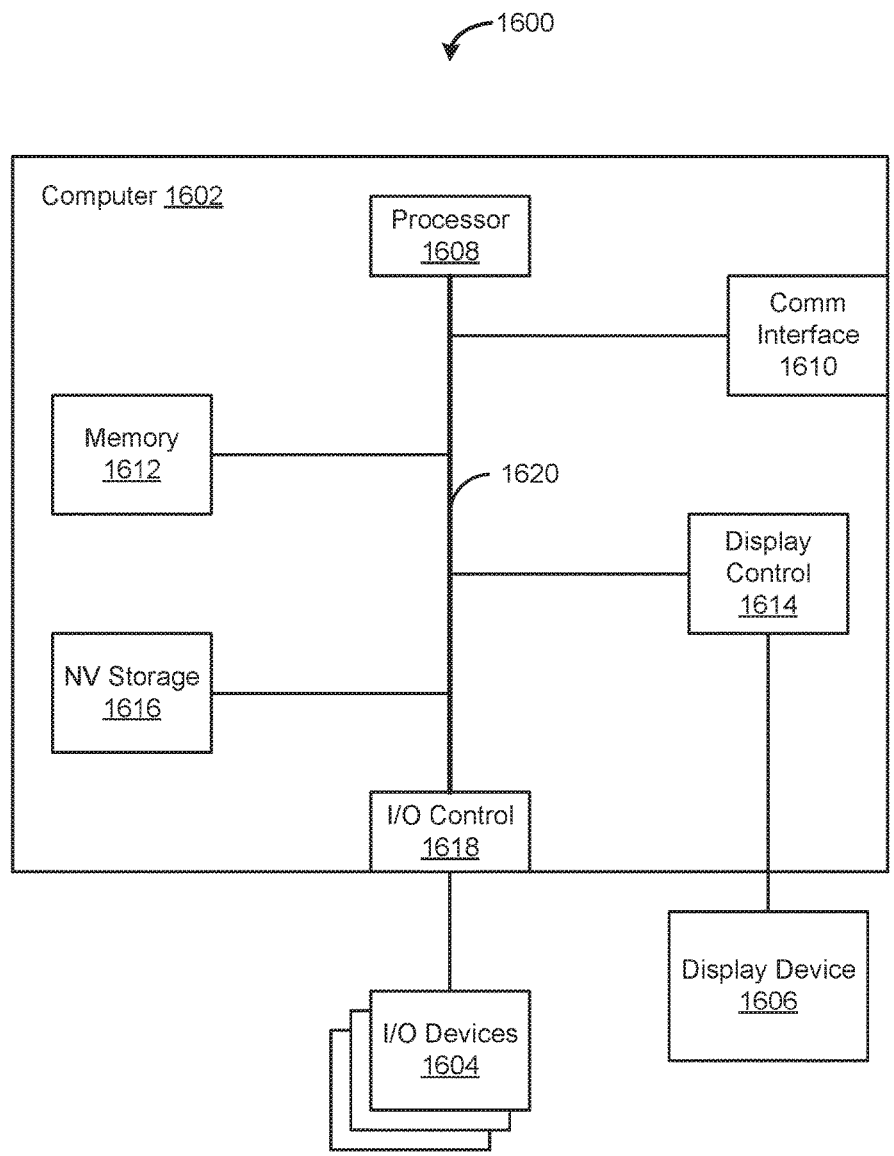
FIG. 16 shows a block diagram of an example of a computer system.

FIG. 16 shows a block diagram 1600 of an example of a computer system 1602, which can be incorporated into various implementations described in this paper. For example, the location sensing mobile devices 104, the beacons 106, the drones 108, the location specific content servers 110, the location specific notification server 112, and the remote playback devices 114, can each comprises specific implementation of the computer system 1600. The example of FIG. 16, is intended to illustrate a computer system that can be used as a client computer system, such as a wireless client or a workstation, or a server computer system. In the example of FIG. 16, the computer system 1600 includes a computer 1602, I/O devices 1604, and a display device 1606. The computer 1602 includes a processor 1608, a communications interface 1610, memory 1612, display controller 1614, non-volatile storage 1616, and I/O controller 1618. The computer 1602 can be coupled to or include the I/O devices 1604 and display device 1606.

The computer 1602 interfaces to external systems through the communications interface 1610, which can include a modem or network interface. It will be appreciated that the communications interface 1610 can be considered to be part of the computer system 1600 or a part of the computer 1602. The communications interface 1610 can be an analog modem, ISDN modem, cable modem, token ring interface, satellite transmission interface (e.g. "direct PC"), or other interfaces for coupling a computer system to other computer systems.

The processor 1608 can be, for example, a conventional microprocessor such as an Intel Pentium microprocessor or Motorola power PC microprocessor. The memory 1612 is coupled to the processor 1608 by a bus 1620. The memory 1612 can be Dynamic Random Access Memory (DRAM) and can also include Static RAM (SRAM). The bus 1620 couples the processor 1608 to the memory 530, also to the non-volatile storage 1612, to the display controller 1614, and to the I/O controller 1618.

The I/O devices 1604 can include a keyboard, disk drives, printers, a scanner, and other input and output devices, including a mouse or other pointing device. The display controller 1614 can control in the conventional manner a display on the display device 1606, which can be, for example, a cathode ray tube (CRT) or liquid crystal display (LCD). The display controller 1614 and the controller 1618 can be implemented with conventional well known technology.

The non-volatile storage 1616 is often a magnetic hard disk, an optical disk, or another form of storage for large amounts of data. Some of this data is often written, by a direct memory access process, into memory 1612 during execution of software in the computer 1602. One of skill in the art will immediately recognize that the terms "machine-readable medium" or "computer-readable medium" includes any type of storage device that is accessible by the processor 1608 and also encompasses a carrier wave that encodes a data signal.

The computer system illustrated in FIG. 16 can be used to illustrate many possible computer systems with different architectures. For example, personal computers based on an Intel microprocessor often have multiple buses, one of which can be an I/O bus for the peripherals and one that directly connects the processor 1608 and the memory 1612 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1612 for execution by the processor 1608. A Web TV system, which is known in the art, is also considered to be a computer system, but it can lack some of the features shown in FIG. 16, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program can be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

For purposes of explanation, numerous specific details are set forth in order to provide a thorough understanding of the description. It will be apparent, however, to one skilled in the art that implementations of the disclosure may be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., steps, modules, blocks, structures, devices, features, etc.) may be variously combined, separated, removed, reordered, and replaced in a manner other than as expressly described and depicted herein.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the implementations is intended to be illustrative, but not limiting, of the scope, which is set forth in the claims recited herein.

The invention claimed is:

1. A method comprising:
    storing venue information associated with a venue, the venue information including a first location portion of the venue and a second location portion of the venue;
    identifying an actual presence of a location sensing mobile device within the venue;
    selecting a first drone from a plurality of drones based on the actual presence of the location sensing mobile device, the first drone associated with the first location portion of the venue;
    receiving first sensor data from the first drone;
    receiving a virtual presence of the location sensing mobile device, the virtual presence being different from the actual presence;
    selecting a second drone from the plurality of drones based on the virtual presence of the location sensing mobile device, the second drone associated with the second location portion of the venue;
    receiving second sensor data from the second drone; and
    transmitting the first sensor data and the second sensor data to the location sensing mobile device.

2. The method of claim 1, further comprising a mobile beacon physically coupled to the first drone.

3. The method of claim 1, wherein the transmitting the first sensor data and the second sensor data to the location sensing mobile device comprises streaming in real-time the first sensor data and the second sensor data to the location sensing mobile device.

4. The method of claim 1, further comprising:
    storing first notification information associated with the first location portion of the venue and second notification information associated with the second location portion of the venue; and
    transmitting the first notification information and the second notification information to the location sensing mobile device in response to satisfaction of one or more trigger notification conditions.

5. The method of claim 4, wherein the first notification information and second notification information comprise any of location specific advertisements or location specific hazard warnings.

6. The method of claim 1, wherein the actual presence is identified based on one or more beacon signals received by the location sensing mobile device from a beacon, the beacon associated with the first location portion of the venue.

7. The method of claim 1, wherein the first sensor data comprising any of (i) image data of the first location portion of the venue or (ii) audio data of the first location portion of the venue.

8. The method of claim 1, wherein the second sensor data comprising any of (i) image data of the second location portion of the venue or (ii) audio data of the second location portion of the venue.

9. A system comprising:
    a location specific content server datastore configured to store venue information associated with a venue, the venue information including a first location portion of the venue and a second location portion of the venue;
    a communication engine configured to receive a communication message indicating an actual presence of a location sensing mobile device within the venue;
    a location specific content generation engine configured to:
    select a first drone from a plurality of drones based on the actual presence of the location sensing mobile device, the first drone associated with the first location portion of the venue;
    receive first sensor data from the first drone;
    receive a virtual presence of the location sensing mobile device, the virtual presence being different from the actual presence;
    select a second drone from the plurality of drones based on the virtual presence of the location sensing mobile device, the second drone associated with the second location portion of the venue;
    receive second sensor data from the second drone; and
    the communication engine further configured to transmit the first sensor data and the second sensor data to the location sensing mobile device.

10. The system of claim 9, wherein a mobile beacon is physically coupled to the first drone.

11. The system of claim 9, wherein the transmitting the first sensor data and the second sensor data to the location sensing mobile device comprises streaming in real-time the first sensor data and the second sensor data to the location sensing mobile device.

12. The system of claim 9, further comprising:
a location specific notification datastore configured to store first notification information associated with the first location portion of the venue and second notification information associated with the second location portion of the venue; and
a location specific notification generation engine configured to transmit the first notification information and the second notification information to the location sensing mobile device in response to satisfaction of one or more notification trigger conditions.

13. The system of claim 12, wherein the first notification information and second notification information comprise any of location specific advertisements or location specific hazard warnings.

14. The system of claim 9, wherein the actual presence is identified based on one or more beacon signals received by the location sensing mobile device from a beacon, the beacon associated with the first location portion of the venue.

15. The system of claim 9, wherein the first sensor data comprising any of image data of the first location portion of the venue or audio data of the first location portion of the venue.

16. The system of claim 9, wherein the second sensor data comprising any of image data of the second location portion of the venue or audio data of the second location portion of the venue.

17. A non-transitory computer readable medium comprising executable instructions, the instructions being executable by a processor to perform a method, the method comprising:
storing venue information associated with a venue, the venue information including a first location portion of the venue and a second location portion of the venue;
identifying an actual presence of a location sensing mobile device within the venue;
selecting a first drone from a plurality of drones based on the actual presence of the location sensing mobile device, the first drone associated with the first location portion of the venue;
receiving first sensor data from the first drone;
receiving a virtual presence of the location sensing mobile device, the virtual presence being different from the actual presence;
selecting a second drone from the plurality of drones based on the virtual presence of the location sensing mobile device, the second drone associated with the second location portion of the venue;
receiving second sensor data from the second drone; and
transmitting the first sensor data and the second sensor data to the location sensing mobile device.

18. The non-transitory computer readable medium of claim 17, wherein the actual presence is identified based on one or more beacon signals received by the location sensing mobile device from a beacon, the beacon associated with the first location portion of the venue.

19. The non-transitory computer readable medium of claim 17, wherein the first sensor data comprising any of (i) image data of the first location portion of the venue or (ii) audio data of the first location portion of the venue.

20. The non-transitory computer readable medium of claim 17, wherein the second sensor data comprising any of (i) image data of the second location portion of the venue or (ii) audio data of the second location portion of the venue.

21. A system comprising:
means for storing venue information associated with a venue, the venue information including a first location portion of the venue and a second location portion of the venue;
means for identifying an actual presence of a location sensing mobile device within the venue;
means for selecting a first drone from a plurality of drones based on the actual presence of the location sensing mobile device, the first drone associated with the first location portion of the venue;
means for receiving first sensor data from the first drone;
means for receiving a virtual presence of the location sensing mobile device, the virtual presence being different from the actual presence;
means for selecting a second drone from the plurality of drones based on the virtual presence of the location sensing mobile device, the second drone associated with the second location portion of the venue;
means for receiving second sensor data from the second drone; and
means for transmitting the first sensor data and the second sensor data to the location sensing mobile device.

22. The system of claim 21, wherein the actual presence is identified based on one or more beacon signals received by the location sensing mobile device from a beacon, the beacon associated with the first location portion of the venue.

23. The system of claim 21, wherein the first sensor data comprising any of (i) image data of the first location portion of the venue or (ii) audio data of the first location portion of the venue.

24. The system of claim 21, wherein the second sensor data comprising any of (i) image data of the second location portion of the venue or (ii) audio data of the second location portion of the venue.

* * * * *